United States Patent [19]
Kitazawa et al.

[11] Patent Number: 5,646,711
[45] Date of Patent: Jul. 8, 1997

[54] MOTOR-DRIVEN CAMERA

[75] Inventors: Toshiyuki Kitazawa; Tomoaki Itabashi, both of Tokyo, Japan

[73] Assignee: Asahi Kogaku Kogyo Kabushiki Kaisha, Tokyo, Japan

[21] Appl. No.: 677,379

[22] Filed: Jul. 5, 1996

[30] Foreign Application Priority Data

Jul. 6, 1995 [JP] Japan ................... 7-171060
Jul. 6, 1995 [JP] Japan ................... 7-171061
Jul. 6, 1995 [JP] Japan ................... 7-171062

[51] Int. Cl.$^6$ ........................... G03B 1/12; G03B 19/12
[52] U.S. Cl. ........................ 396/413; 396/418; 396/354
[58] Field of Search ........................ 354/152, 173.1, 354/173.11, 212, 214

[56] References Cited

U.S. PATENT DOCUMENTS

| | | |
|---|---|---|
| 4,855,772 | 8/1989 | Hashimoto et al. . |
| 4,881,092 | 11/1989 | Fukahori et al. ................... 354/152 |
| 4,954,859 | 9/1990 | Kitazawa . |
| 5,122,820 | 6/1992 | Pagano et al. ................... 354/275 |
| 5,136,314 | 8/1992 | Kazami et al. ................... 354/173.1 |
| 5,296,887 | 3/1994 | Zander ................... 354/275 |

*Primary Examiner*—A. A. Mathews
*Attorney, Agent, or Firm*—Greenblum & Bernstein P.L.C.

[57] ABSTRACT

An SLR camera which uses a film cartridge having a spool includes first and second motors. The first motor performs a film advancing operation, in which the first motor rotates the spool to advance a film wound on the spool from the film cartridge, and a film rewinding operation, in which the first motor rotates the spool so as to rewind the film into the film cartridge. The second motor performs a film winding operation, in which the second motor rotates a film take-up spool provided in the camera to wind the film around the film take-up spool, a shutter charging operation, in which a shutter charge is performed, a mirror up operation, in which a quick-return mirror provided in the camera is moved up after a shutter release, and a mirror down operation, in which the quick-return mirror is moved down after the mirror up operation is completed.

27 Claims, 20 Drawing Sheets

MOTOR-DRIVEN CAMERA

BACKGROUND OF THE INVENTION

1. Field of the Invention

The present invention relates to a motor-driven camera in which film winding/rewinding operations and other operations are efficiently and effectively carried out by two motors provided in the camera.

2. Description of Related Art

Recently, a new type of film cartridge for use in cameras has been proposed. In a conventional film cartridge used in cameras, a film leader or tongue is placed outside of the film cartridge by a small amount, in advance, so as to be manually drawn out and engaged with a film take-up spool provided in the camera when the film cartridge is loaded. However, in the new type of film cartridge, all the film, including the film leader, is housed inside the cartridge before use (in an unexposed state). When in use, a slot which is formed on the cartridge and is closed by an openable door when not in use, is opened by opening the openable door and subsequently the film leader comes out of the slot by a rotation of a spool in the film cartridge. Such a new type of film cartridge is disclosed in U.S. Pat. No. 5,122,820 or U.S. Pat. No. 5,296,887.

In a camera using such a new type of film cartridge, in the case where various kinds of operations such as film winding/rewinding, shutter charge, quick-return mirror up/down operations, etc. are carried out using motors, it is very important to establish beforehand a space-efficient arrangement for the motors in the camera and an efficient allocation of the motors, i.e., which motors are to be allocated to which operations, so as not to increase either the number of motors or the size of the camera.

In recent years, the majority of cameras sold have been so called automatic cameras in which film winding/rewinding operations are performed automatically using a motor. In a conventional automatic camera a regular wind control is usually adopted in which a film is wound by one picture frame through a rotation of the film take-up spool of the camera each time a picture is taken. Another type of wind control, known as a prewind control, is also known in which all the film is wound in advance immediately after the film cartridge is loaded in the camera. With this type of control, each time a picture is taken, the film is rewound back inside the film cartridge by one picture frame, due to a rotation of the spool in the film cartridge.

In a conventional automatic SLR camera, not only film winding/rewinding operations, but also quick-return mirror up/down operations, need to be automatically performed using a motor. Therefore, it is necessary to provide a plurality of motors. However, this complicates driving control.

SUMMARY OF THE INVENTION

One object of the present invention is to provide a motor-driven SLR camera in which various kinds of operations such as film winding/rewinding operations, shutter charge operation, quick-return mirror up/down operations, etc. are efficiently allocated to two motors provided in the camera, which makes it possible to minimize the size of the camera.

Another object of the present invention is to provide a motor driven camera using the above-noted new type of film cartridge which is provided with a film advancing mechanism of a small and simple structure, and which can efficiently draw a film out of the film cartridge and advance the same.

Still another object of the present invention is to provide a motor driven camera in which film winding/rewinding operations are performed through motors, and which has a simple mechanism allowing a photographer to select either a regular wind operation or a prewind control.

To achieve the objects mentioned above, according to an aspect of the present invention, there is provided an SLR camera which uses a film cartridge having a spool. The SLR camera includes a first and a second motor. The first motor performs a film advancing operation, in which the first motor rotates the spool to advance a film wound on the spool from the film cartridge, and a film rewinding operation, in which the first motor rotates the spool so as to rewind the film into the film cartridge. The second motor performs a film winding operation, in which the second motor rotates a film take-up spool provided in the SLR camera to wind the film around the film take-up spool, a shutter charging operation, in which a shutter charge is performed, a mirror up operation, in which a quick-return mirror provided in the SLR camera is moved up after a shutter release, and a mirror down operation, in which the quick-return mirror is moved down after the mirror up operation is completed.

With this structure, the film winding/rewinding operations, shutter charge operation and quick-return mirror up/down operations, which are all to be performed in the camera, are efficiently and effectively allocated to only two motors, i.e., the first and second motors, which are space efficiently disposed in the camera, thus realizing a small and compact camera.

Specifically, the second motor is used not only for the film winding operation, but also for the shutter charging operation and the mirror up/down operations, thus resulting in a small number of motors necessary for the camera, thus realizing a small and compact camera.

Preferably, the first motor is provided in the SLR camera positioned between a mirror box, in which the quick-return mirror is rotatably supported, and a film chamber, which is formed in the SLR camera for accommodating the film cartridge. The first motor is provided with a rotating shaft extending normal to a moving direction of the film and parallel to a plane of the film.

A shutter blade drive mechanism is preferably positioned between a spool chamber, in which the film take-up spool is rotatably supported, and the mirror box. The second motor is provided in the SLR camera adjacent to the shutter blade drive mechanism, and is provided with a rotating shaft extending parallel to the moving direction of the film.

Preferably, the first motor performs the film advancing operation by rotating the rotating shaft thereof in a first rotational direction, and performs the film rewinding operation by rotating the rotating shaft thereof in a second rotational direction. The second motor performs any one of the shutter charging operation, the mirror up operation and the mirror down operation by rotating the rotating shaft thereof in a first rotational direction, and performs the film winding operation by rotating the rotating shaft thereof in a second rotational direction.

According to another aspect of the present invention, a camera which uses a film cartridge having a spool on which a film is wound is provided, including a film chamber in which the film cartridge is accommodated. A spool chamber is provided in which a film take-up spool for winding the film thereon is rotatably supported. A first motor and a second motor are also provided. The first motor performs a film advancing operation, in which the first motor rotates the spool so as to advance the film wound on the spool from the film cartridge, and a film rewinding operation, in which the first motor rotates the spool to rewind the film into the film cartridge. The second motor performs a film winding operation, in which the second motor rotates the film take-up spool to wind the film around the film take-up spool. Means for controlling the first motor and the second motor is also provided. The controlling means actuates the first motor with pulse current and direct current when the first motor performs the film advancing operation and the film rewinding operation, respectively.

With this structure, since the controlling means actuates the first motor with pulse current and direct current when the first motor performs the film advancing operation and the film rewinding operation, respectively, the film winding speed exceeds the film advancing speed, when the film advancing operation and the film winding operation are simultaneously performed. Therefore, it is not necessary to provide a mechanical interlocking mechanism which mechanically connects between a film advancing mechanism and a film take-up spool drive mechanism for mechanically offsetting the difference in speed between the film advancing speed and the film winding speed.

Preferably, the controlling means actuates the second motor with direct current when the second motor performs the film winding operation.

It is preferred that the camera is an SLR camera, and that the second motor further performs a shutter charging operation, in which a shutter charge is performed, a mirror up operation, in which a quick-return mirror provided in the SLR camera is moved up after a shutter release, and a mirror down operation, in which the quick-return mirror is moved down after the mirror up operation is completed.

Preferably, the film cartridge consists of a rotational member which is rotated together with the spool, and is provided with a bar code. The camera further has means for reading information from the bar code. The first motor further performs a rotating member driving operation, in which the first motor rotates the rotational member by rotating the spool so that the reading means reads the information from the bar code.

According to yet another aspect of the present invention, a camera which uses a film cartridge having a spool on which a film is wound is provided. The camera includes a film chamber in which the film cartridge is accommodated. A spool chamber is provided in which a film take-up spool for winding the film thereon is rotatably supported. First and second motors are also provided. The first motor performs a film advancing operation, in which the first motor rotates the spool so as to advance the film wound on the spool from the film cartridge, and a film rewinding operation, in which the first motor rotates the spool so as to rewind the film into the film cartridge. The second motor performs a film winding operation, in which the second motor rotates the film take-up spool so as to wind the film around the film take-up spool. A wind control selecting means is also provided for selecting either a regular wind control, in which the second motor rotates the film take-up spool to wind the film in the spool chamber by one frame each time a picture is taken after the film cartridge has been loaded in the film chamber, or a prewind control, in which the second motor starts rotating the film take-up spool to wind up all the film in the spool chamber immediately after the film cartridge has been loaded in the film chamber and in which the first motor rotates the spool to rewind the film in the film chamber by one frame each time a picture is taken. Means are provided for controlling the first motor and the second motor in accordance with one of the regular wind control and the prewind control which has been selected through the wind control selecting means.

With this structure, since the camera is provided with the first motor, which performs the film advancing operation and the film rewinding operation, the second motor, which performs the film winding operation, the wind control selecting means for selecting either the regular wind control or the prewind control, and means for controlling the first motor and the second motor in accordance with one of the regular wind control and the prewind control which has been selected through the wind control selecting means, a simple structure can be realized which makes it possible to select either the regular wind control or the prewind control.

The wind control selecting means preferably consists of an operational switch for manually selecting either the regular wind control or the prewind control.

The operational switch is preferably provided on a camera body at a position where the operational switch may be operable from outside the camera body, but equally the operational switch can be provided inside the camera body at a position where the operational switch may not be operable from outside the camera body.

Preferably, the camera also includes means for storing photographic data regarding each exposed frame of the film, a magnetic head for recording the photographic data on a magnetic layer formed on the film, and means for recording the photographic data of one frame of the film on a corresponding portion of the magnetic layer through the magnetic head when the one frame is exposed, in a case where the prewind control is selected through the wind control selecting means, and for firstly storing the photographic data in the storing means each time a picture is taken, and secondly recording all the stored photographic data correspondingly and consecutively on the magnetic layer through the magnetic head when all the film is rewound in the film cartridge, in a case where the regular wind control is selected through the wind control selecting means.

Preferably, the magnetic head is positioned between the film chamber and a photographic aperture through which light of a subject is incident upon the film, the photographic aperture being formed between the film chamber and the spool chamber.

The camera is preferably an SLR camera. The second motor preferably further performs a shutter charging operation, in which a shutter charge is performed, a mirror up operation, in which a quick-return mirror provided in the SLR camera is moved up after a shutter release, and a mirror down operation, in which the quick-return mirror is moved down after the mirror up operation is completed.

The present disclosure relates to subject matter contained in Japanese Patent Applications No.7-171060 (filed on Jul. 6, 1995), No.7-171061 (filed on Jul. 6, 1995) and No.7-171062 (filed on Jul. 6, 1995) which are expressly incorporated herein by reference in their entireties.

BRIEF DESCRIPTION OF THE DRAWINGS

The invention will be described below in detail with reference to the accompanying drawings in which like elements are indicated by like reference numerals, and wherein.

DESCRIPTION OF THE PREFERRED EMBODIMENTS

Figure 1:
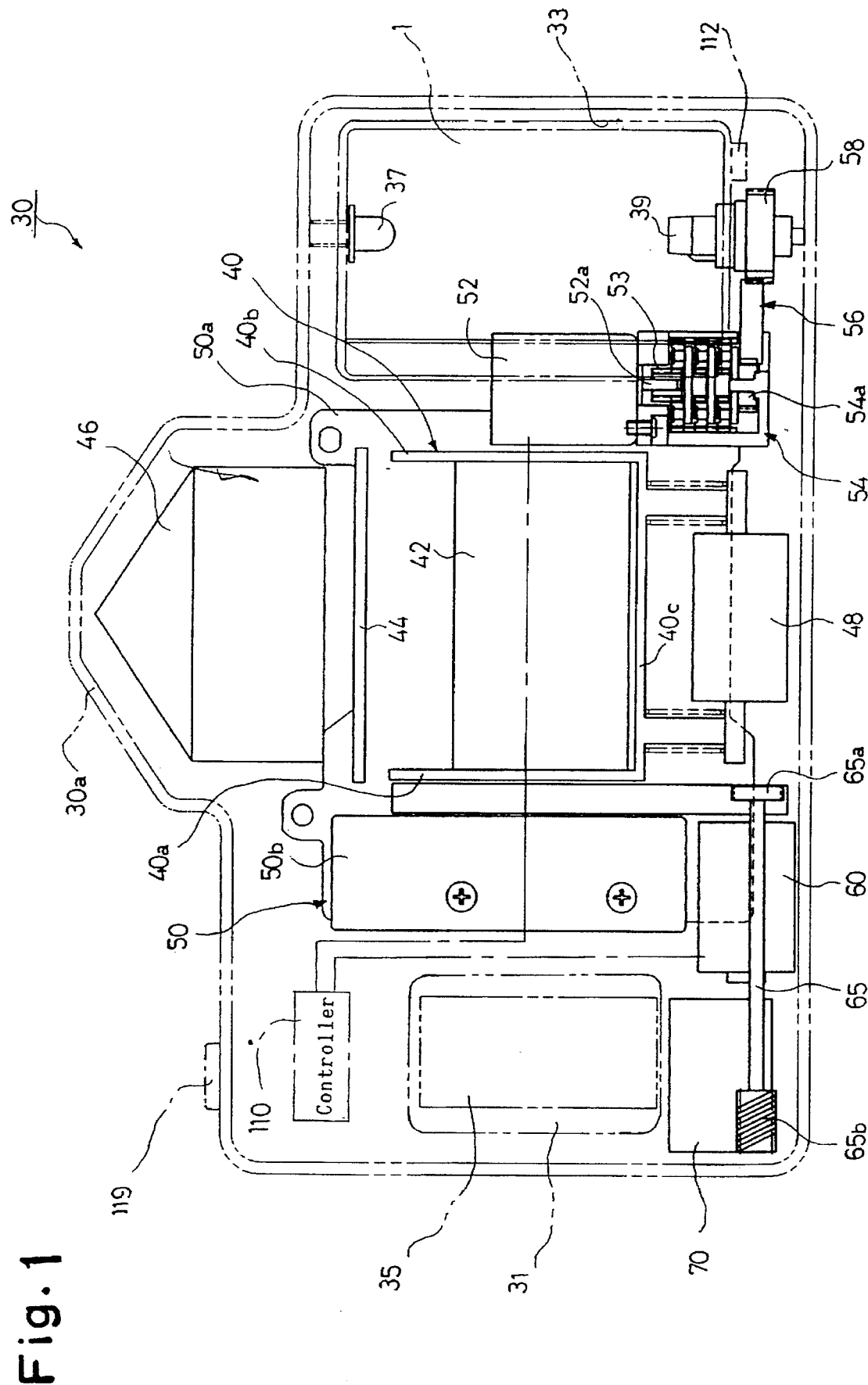
FIG. 1 is a front elevational view showing an inner structure of a motor-driven SLR camera to which a first aspect of the present invention is applied.
Figure 4:
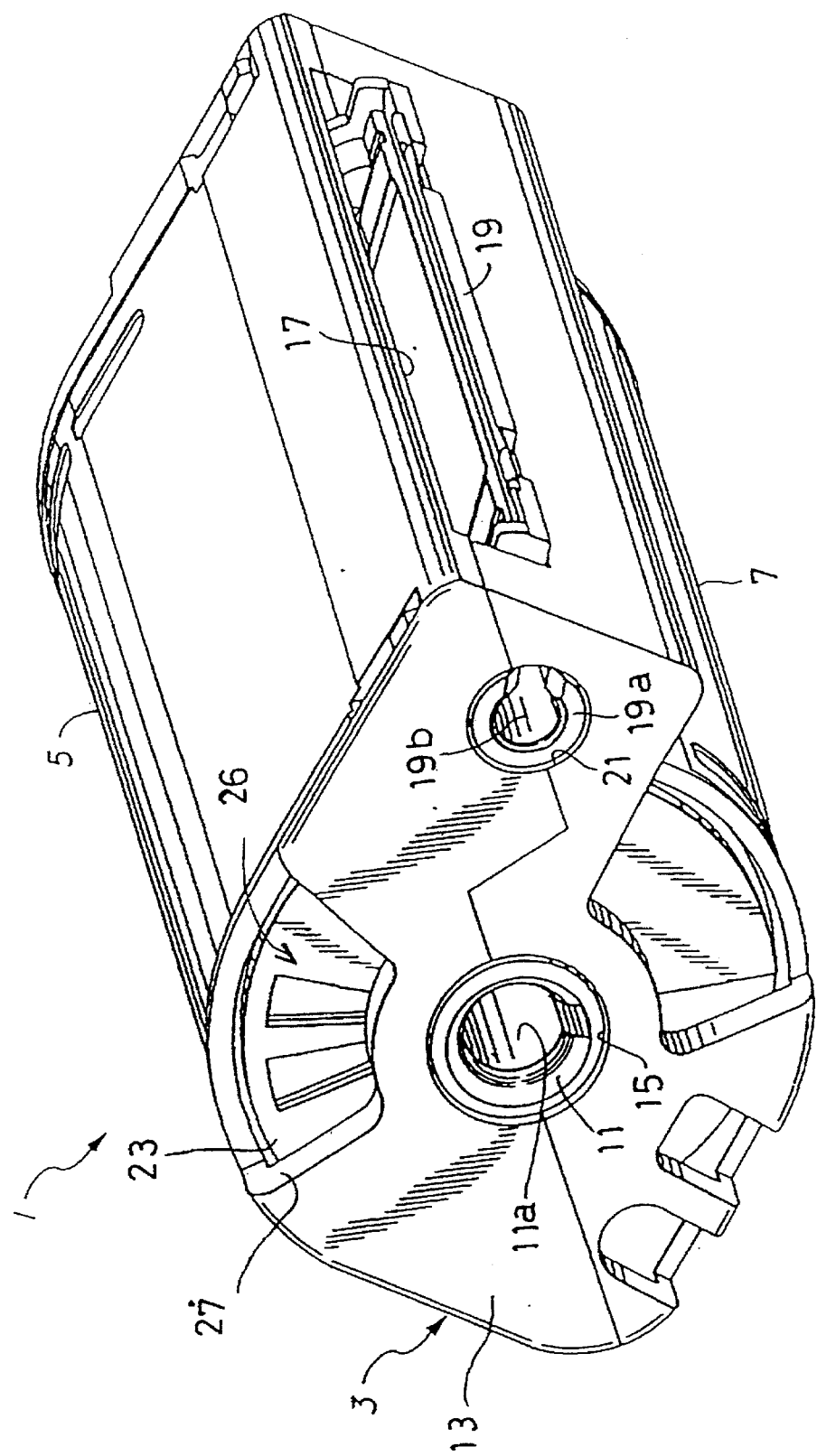
FIG. 4 is a perspective view of a film cartridge used for the camera shown in FIGS. 1 or 2.
Figure 5:
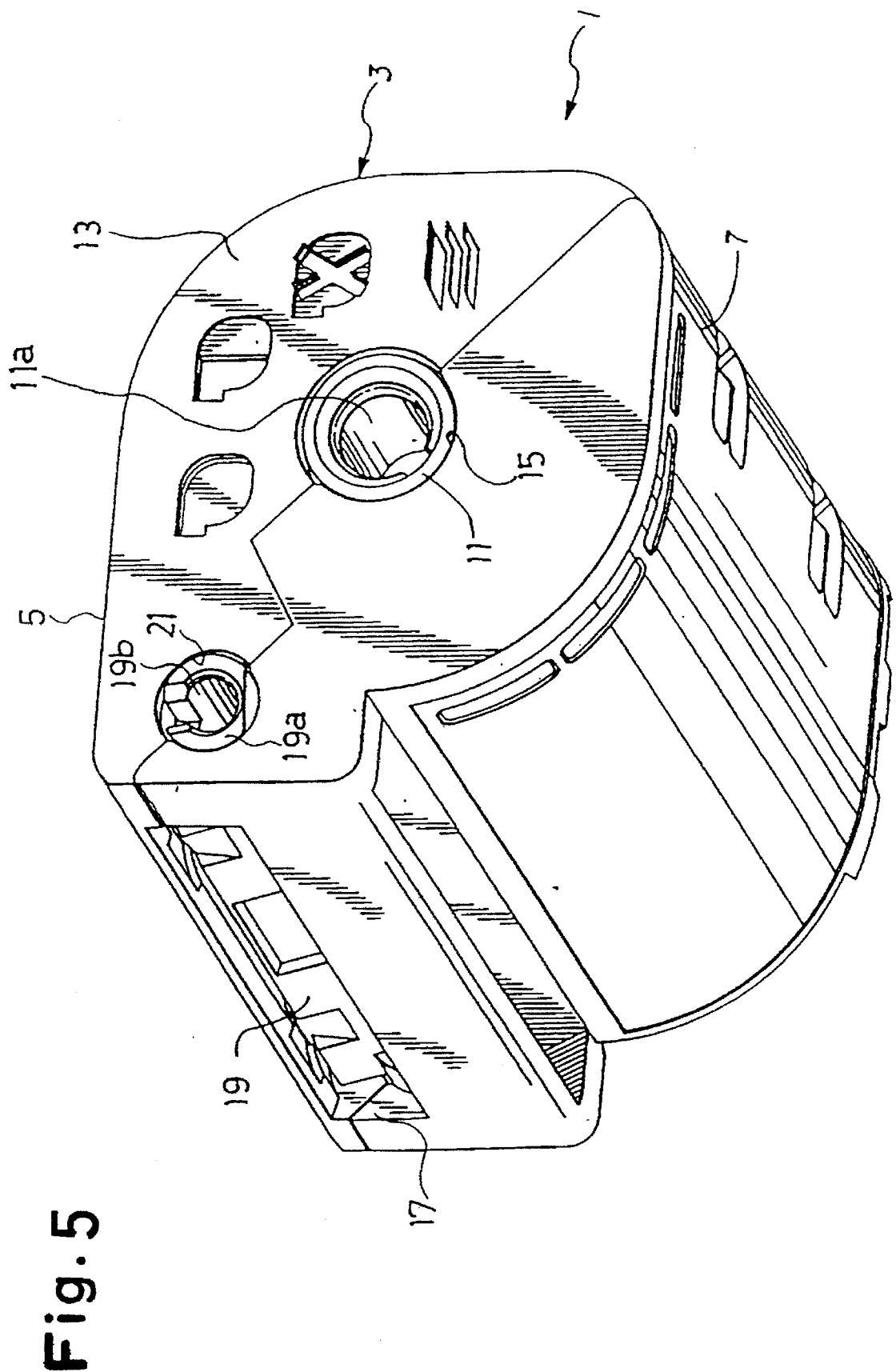
FIG. 5 is another perspective view of the film cartridge shown in FIG. 4.

The SLR camera 30 shown in FIG. 1 to which the present invention is applied, uses a specific type of film cartridge disclosed in U.S. Pat. No. 5,122,820 or U.S. Pat. No. 5,296,887. Such a type of film cartridge will be firstly discussed hereinafter with reference to FIGS. 4 and 5.

A film cartridge 1 has a casing 3 consisting of two casing members 5 and 7. In the casing 3 a spool 11 (shown in FIG. 6) is accommodated, on which a film F (see FIG. 2), having a magnetic layer, is rolled. The spool 11 is provided at each end thereof with an engaging hole 11a, and the casing 3 is provided on each end plate 13 thereof with an opening 15, to expose the corresponding engaging hole 11a outside the casing 3.

The casing 3 is also provided, along a longitudinal direction thereof, with a slot 17 having a rectangular shape. The slot 17 is opened or closed by an openable door 19 provided along the slot 17. The door 19 is provided at each end thereof with a pivotal portion 19a along a common axis, and each pivotal portion 19a is rotatably engaged with a corresponding bearing hole 21 formed on the corresponding end plate 13. With this structure the door 19 is opened or closed while rotating about the pivotal portions 19a.

A keyhole 19b is formed on each pivotal portion 19a. One of the keyholes 19b is engaged with a key (not shown) of a commonly-known cartridge door drive mechanism (not shown) provided in a camera when the cartridge 1 is inserted into the camera. The door 19 is opened or closed when the film F, housed in the film cartridge 1, is drawn from or returned to the slot 17 by a rotation of the spool 11, while the slot 17 is kept open.

Figure 6:
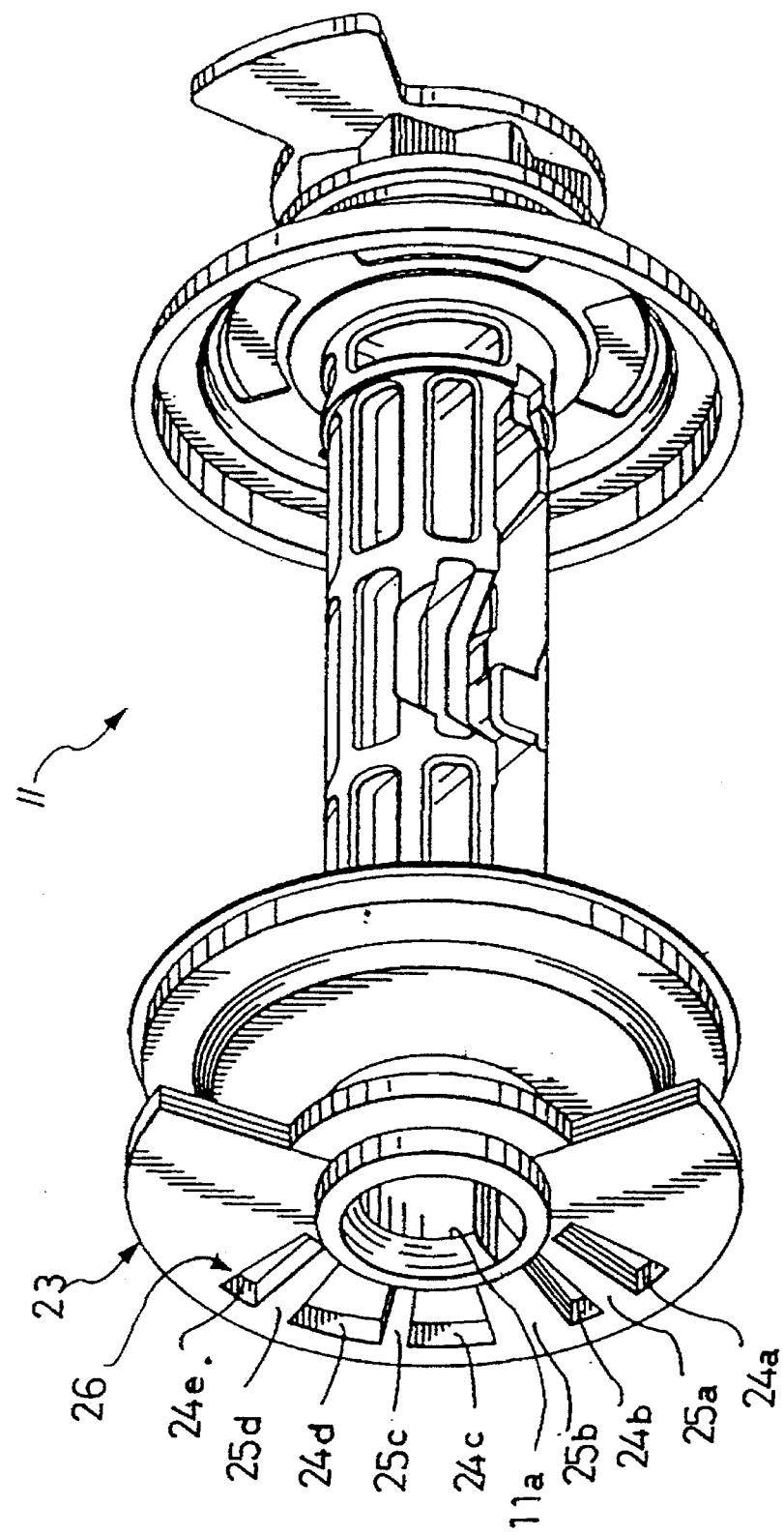
FIG. 6 is a perspective view of a spool provided in the film cartridge shown in FIGS. 4 or 5.

As shown in FIG. 6, there is provided a partial disc member 23 between one of the ends of the spool 11 and the corresponding end plate 13 of the casing 3. The partial disc member 23 is fitted such as not to rotate with respect to the spool 11. That is, the partial disc member 23 rotates together with the spool 11 when the spool 11 rotates.

The partial disc member 23 is provided with a predetermined bar code 26 consisting of slits 24a, 24b, 24c, 24d and 24e each having a predetermined width, and non-slit portions 25a, 25b, 25c and 25d each being positioned between two adjacent slits and having a predetermined width. Each slit or non-slit portion extends in a radial direction from a central axis of the spool 11. The bar code 26 contains information about the film cartridge 1 regarding the film ISO speed, the number of exposures, etc. The bar code 26 is exposed outside the film cartridge 1 through an opening 27 formed on the corresponding end plate 13 of the casing 3.

Details regarding the camera 30 will be hereinafter discussed with reference to FIGS. 1 and 2. A spool chamber 31 and a film chamber 33 are respectively formed in the left and right-hand sides of the camera 30, as viewed in FIG. 1. A film take-up spool 35 is rotatably supported in the spool chamber 31. An openable cover (not shown) for opening or closing the film chamber 33 is pivotally supported towards the rear of the camera 30.

The camera 30 adopts a prewind control in which all the film housed in the film cartridge 1 is wound by a rotation of the film take-up spool 35 in advance, immediately after the film cartridge 1 is loaded in the film chamber 33. Each time a picture is taken, the film F is rewound back into the film cartridge 1 by an amount corresponding to one picture frame, due to a rotation of the spool 11 in the film cartridge 1. The film F in the film cartridge 1 commences to be wound by a rotation of the film take-up spool 35 immediately after the above-noted openable cover, for opening or closing the film chamber 33, is closed, after an unexposed film cartridge 1 has been loaded in the film chamber 33.

In the film chamber 33, a supporting projection 37, extending downwards, and a spool drive fork 39, extending upwards, are provided along a common axis on the upper and lower ends of the film chamber 33, respectively (as viewed in FIG. 1). The supporting projection 37 and the spool drive folk 39 respectively engage with the corresponding engaging hole 11a, when the film cartridge 1 is loaded in the film chamber 33. The spool 11 is driven to rotate when the spool drive fork 39 rotates. The supporting projection 37 merely supports the spool 11 in a rotatable fashion as a rotational center when the spool 11 is rotated by a rotation of the spool drive fork 39.

At the bottom of the film chamber 33 a photosensor 112 for reading the information of the bar code 26, is fixed at a position opposed to the opening 27 of the film cartridge 1, when the film cartridge 1 is loaded in the film chamber 33.

A mirror box 40 is fixed to the camera body 30a between the spool chamber 31 and the film chamber 33. The mirror box 40 consists of left and right walls 40a, 40b and a bottom plate 40c which connects the lower ends of the left and right walls 40a, 40b, as shown in FIG. 1. The mirror box 40 is provided with a quick-return mirror 42, usually located at a lower position when a picture is not being taken but is moved up to an upper position when a picture is taken. A pentaprism 46 is fixed to the camera body 30a, above the quick-return mirror 42. A focusing screen 44 is fixed between the pentaprism 46 and the quick-return mirror 42. Below the mirror box 40 an AF sensor module 48 is provided. The AF sensor module 48 has a pair of image forming lenses and a multi-segment CCD sensor (both not shown). Part of the center of the image projected beneath the quick-return mirror 42 towards the AF sensor module 48, is split in two through the aforementioned pair of image forming lenses, and the two split images are subsequently projected onto the aforementioned multi-segment CCD sensor. The multi-segment CCD sensor phase-detects the relative locations of the two images so as to calculate a lens focusing movement necessary for a sharp image.

An electronic-controlled focal-plane shutter unit 50 is fixed between the spool chamber 31 and the film chamber 33. The shutter unit 50 consists of a shutter block 50a placed behind the mirror box 40 and a shutter blade driver 50b placed between the spool chamber 31 and the mirror box 40. The shutter block 50a has a plurality of shutter blades (not shown) which are driven by the shutter blade driver 50b.

Figure 2:
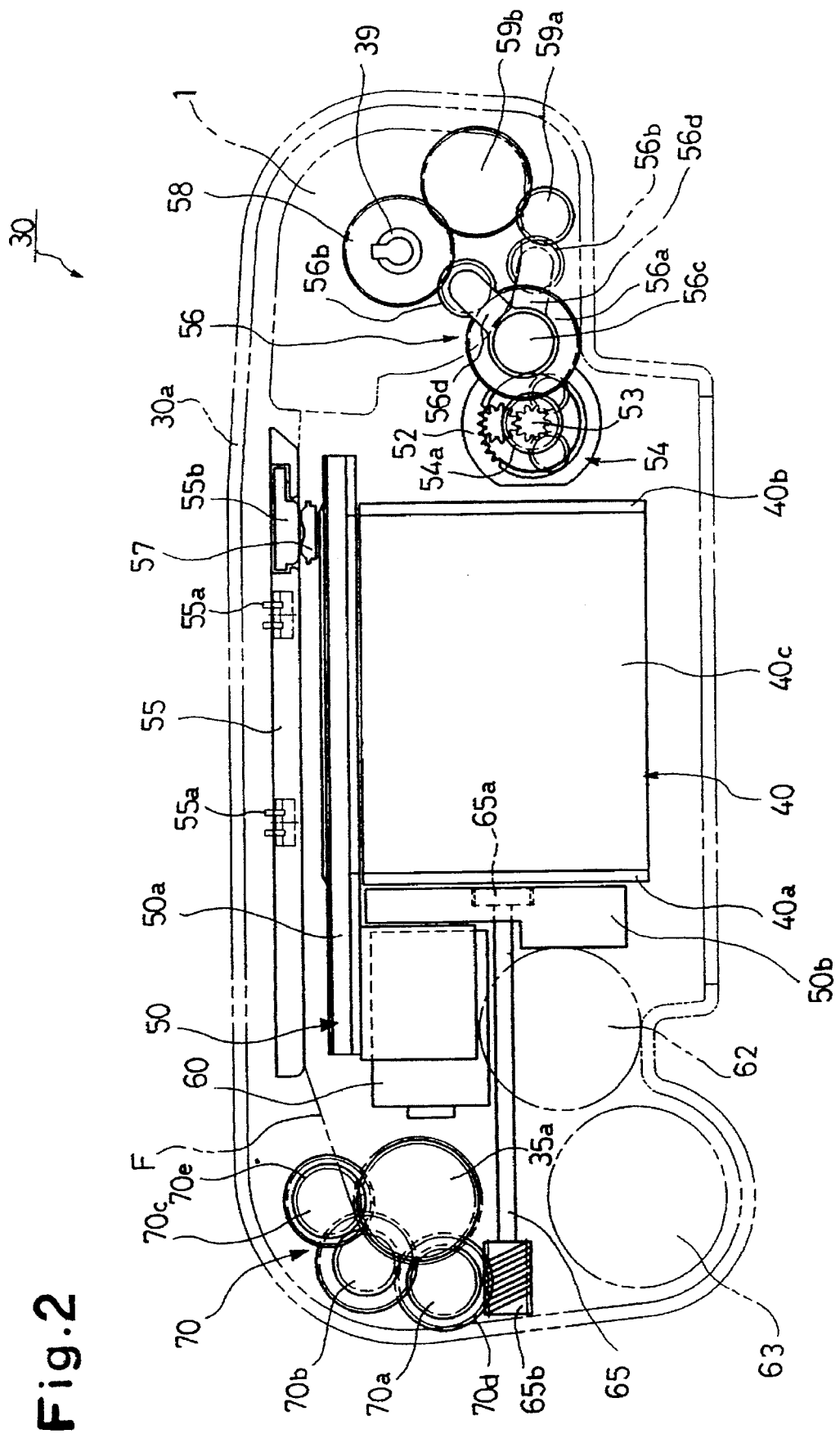
FIG. 2 is a plan view of the camera shown in FIG. 1.

Behind the shutter block 50a is provided a pressure plate 55 which extends parallel to the shutter block 50a, as shown in FIG. 2. An aperture frame (not shown) is fixed to the camera body 30a immediately behind the shutter block 50a. The aperture frame is provided on a center thereof with a rectangular-shaped photographic aperture which forms the limits of each frame exposed. The aperture frame is further provided, on upper and lower sides relative to the photographing aperture, with film guiding rails, each extending in a horizontal direction (horizontal direction of FIGS. 1 or 2) of the camera 30. The aforementioned pressure plate 55 is placed immediately behind the aperture frame. A pair of photoreflectors 55a are fixed to the pressure plate 55. The pair of photoreflectors 55a detect perforations (not shown) provided on the film F so as to detect the state of the film, i.e., whether or not the film is moving, and also to detect the winding amount of the film F. A magnetic head 55b is also fixed to the pressure plate 55. Through the magnetic head 55b various photographic data can be recorded on the magnetic layer of each picture frame of the film F. The photographic data can include shutter speed data, aperture value data, brightness value data, strobe data, date of photographing, etc. A pressure pad 57 is fixed on the aforementioned aperture frame at a position opposed to the magnetic head 55b. Through the pressure pad 57 the film F is brought into pressing contact with the magnetic head 55b with an appropriate pressure.

A first motor 52 having a rotating shaft 52a is fixed to the camera body 30a between the mirror box 40 and the film chamber 33. The rotating shaft 52a of the first motor 52 extends along a vertical direction (vertical direction of FIG. 1) of the camera 30, that is, along a direction perpendicular to a film moving direction (a horizontal direction in FIGS. 1 or 2). A rotation of the rotating shaft 52a is transmitted to the spool drive fork 39 through an output pinion 53 fixed to the rotating shaft 52a, a reduction gear train 54 provided immediately below the first motor 52, a planetary gear 56 provided close to the reduction gear train 54, a drive gear 58 which is provided coaxial to the spool drive fork 39 and rotates together with the spool drive fork 39, etc.

The first motor 52 is responsible for the following three operations:.

(1) a partial disc member driving operation, in which the first motor 52 drives the spool drive fork 39 to rotate in a forward rotational direction (the clockwise direction in FIG. 2) by a predetermined rotation amount (e.g., one to two rotations), immediately after the above-noted openable cover for opening or closing the film chamber 33 is closed after the unexposed film cartridge 1 has been loaded in the film chamber 33, so as to rotate the partial disc member 23 in the same rotational direction by the same predetermined amount of rotation to read out the information of the bar code 26, formed on the partial disc member 23, through the photosensor 112;

(2) a film advancing operation, performed after the aforementioned partial disc member driving operation, in which the first motor 52 drives the spool drive fork 39 to rotate in a backward (reverse) rotational direction (the counterclockwise direction in FIG. 2) so as to draw the film F out of the film cartridge 1 through the slot 17 and to deliver the film leader of the film F to the spool chamber 31; and (3) a film rewinding operation, in which the first motor 52 drives the spool drive fork 39 to rotate in the forward rotational direction immediately after one picture frame is exposed, so as to accommodate an exposed frame in the film cartridge 1 after each exposure.

As shown in FIG. 1, a second motor 60 having a rotating shaft 60a (FIG. 3) is fixed to the camera body 30a at a position below the lower end of the shutter blade driver 50b. The rotating shaft 60a of the second motor 60 extends along a horizontal direction (horizontal direction of FIGS. 1 or 2) of the camera 30, that is, along the film moving direction of the film F. A rotation of the second motor 60 is transmitted to the film take-up spool 35 through a planetary gear 75, a shaft 65, a reduction gear train 70, etc. A rotation of the second motor 60 is also transmitted to a shutter charging gear 90 and a mirror drive gear 100 through the planetary gear 75, a reduction gear train 80, etc.

The second motor 60 is responsible for the following three operations:

(1) a film winding operation, in which the second motor 60 drives the film take-up spool 31 to rotate so as to wind the film F thereon;

(2) a shutter charging operation, for charging the shutter unit 50; and (3) a mirror up/down operation, for moving the quick return mirror 42 up or down.

The rotation transmitting mechanisms of the first and second motors 52, 60 will be hereinafter discussed.

The rotation transmitting mechanism of the first motor 52 will be firstly discussed with reference to FIG. 2.

The planetary gear 56 consists of a sun gear 56a and a planet gear 56b, which remains in mesh with the sun gear 56a. The sun gear 56a has a rotational shaft 56c, serving as a rotational axis, and remains in mesh with a final gear 54a of the reduction gear train 54. One end of a rotational arm 56d is pivoted on the rotational shaft 56c and the planet gear 56b is rotatably provided on the other end of the rotational arm 56d. The rotational arm 56d is allowed to rotate by stoppers or the like (not shown) fixed to the camera body 30a within a limited range, i.e., between a first position and a second position indicated by a solid line and a phantom line in FIG. 2, respectively. Near the planetary gear 56 a relay gear train 59 is provided consisting of a small gear 59a and a large gear 59b. The large gear 59b remains in mesh with the small gear 59a and the drive gear 58.

The planet gear 56b is in mesh with the drive gear 58 when the rotational arm 56d is at a first position, and the planet gear 56b is in mesh with the small gear 59a when the rotational arm 56d is at a second position. The first motor 52, the reduction gear train 54, the planetary gear 56, the drive gear 58, the spool drive fork 39, etc. constitute a film advancing mechanism of the camera 30.

Due to the rotation transmitting mechanism of the first motor 52, having the structure mentioned above, when the rotating shaft 52a of the first motor 52 rotates in one rotational direction (reverse direction), the final gear 54a rotates in the clockwise direction, to thereby rotate the sun gear 56a in the counterclockwise direction, as viewed in FIG. 2. Due to the rotation of the sun gear 56a in the counterclockwise direction, the rotational arm 56d rotates in the same rotational direction, i.e., the counterclockwise direction in FIG. 2, to reach its first position, so that the planet gear 56b rotating in the clockwise direction in FIG. 2 is brought into mesh with the drive gear 58. Therefore, the drive gear 58 rotates in the counterclockwise direction in FIG. 2 to thereby rotate the spool drive fork 39 in the same counterclockwise direction.

On the other hand, when the rotating shaft 52a of the first motor 52 rotates in the other rotational direction (forward rotational direction), the final gear 54a rotates in the counterclockwise direction, to thereby rotate the sun gear 56a in the clockwise direction, as viewed in FIG. 2. Due to the rotation of the sun gear 56a in the clockwise direction, the rotational arm 56d rotates in the same rotational direction, i.e., the clockwise direction in FIG. 2, to reach its second position, so that the planet gear 56b, rotating in the counterclockwise direction in FIG. 2, is brought into mesh with the small gear 59a. Due to the rotation of the planet gear 56b in the counterclockwise direction the small gear 59a rotates in the clockwise direction to thereby rotate the large gear 59b in the counterclockwise direction in FIG. 2. Therefore, the drive gear 58 rotates in the clockwise direction in FIG. 2 to thereby rotate the spool drive fork 39 in the same clockwise direction.

Next, the rotation transmitting mechanism of the second motor 60 will be discussed with reference to FIG. 3. An output pinion 61 is fixed to the rotating shaft 60a of the second motor 60. A composite gear 71 consisting of a large gear 71a and a small gear 71b, which are coaxially formed integral with each other, is provided near to the output pinion 61. The output pinion 61 remains in mesh with the large gear 71a of the composite gear 71.

The planetary gear 75 consists of a sun gear 75a and a planet gear 75b, remaining in mesh with the sun gear 75a. The sun gear 75a has a rotational shaft 75c, serving as a rotational axis, and remains in mesh with the small gear 71b of the composite gear 71. One end of a rotational arm 75d is pivoted on the rotational shaft 75c, and the planet gear 75b is rotatably provided on the other end of the rotational arm 75d. The rotational arm 75d is allowed to rotate by stoppers or the like (not shown) fixed on the camera body 30a within a limited range, i.e., between a first position and a second position indicated by a solid line and a phantom line in FIG. 3, respectively. The reduction gear train 80 is provided in front of the planetary gear 75 (on the right side of the planetary gear 75 in FIG. 3) consisting of first, second and third gears 80a, 80b and 80c, respectively. The third gear 80c remains in mesh with the shutter charging gear 90, which remains in mesh with the mirror drive gear 100. The shutter charging gear 90 is rotatably fitted on a rotational shaft 90a, serving as a rotational axis, extending parallel to the horizontal direction of the camera 30.

The third gear 80c is fitted on a rotational shaft 80d on which one end 91a of a shutter charging lever 91 of a curved shape is pivoted. An engaging projection 91c is formed integral with the other end (free end) 91b of the shutter charging lever 91. The engaging projection 91c is engageable with a shutter-charge engaging portion (not shown) of the shutter blade driver 50b for a shutter charge. A projection 91d extending in the direction of the rotational shaft 90a is formed integral with the shutter charging lever 91. An axial pin 91f, extending parallel to the rotational shaft 80d, is fixed on the projection 91d, and a roller 91e is rotatably fitted on the axial pin 91f. The shutter charging lever 91 is always biased in the clockwise direction, as viewed in FIG. 3, by a biasing member (not shown) such as a coil or torsion spring or the like.

The shutter charging gear 90 is provided with a charging cam 90c formed integrally thereon. The charging cam 90c has a cam surface 90b along its peripheral edge which comes into contact with the roller 91e. In the state shown in FIG. 3, the rotation of the shutter charging gear 90 in the clockwise direction makes the roller 91e pushed downwards by the cam surface 90b against the biasing force of the aforementioned biasing member that biases the shutter charging lever 91, to thereby rotate the shutter charging lever 91 in the counterclockwise direction in FIG. 3.

In the vicinity of the mirror drive gear 100, a mirror drive lever 103 of a curved shape is provided. The mirror drive gear 100 is rotatably fitted on a rotational shaft 100a extending parallel to the rotational shaft 90a. One end 103a of the mirror drive lever 103 is pivoted on a rotational shaft 102 extending parallel to the rotational shaft 100a. An engaging projection 103b is formed integral with the other end (free end) of the mirror drive lever 103. The engaging projection 103b is engageable with a mirror sheet pin 105 formed on the quick-return mirror 42. The quick-return mirror 42 is pivoted on a shaft 104 extending in the horizontal direction of the camera 30. A projection 103c extending in the direction of the rotational shaft 100a is formed integral with the mirror drive lever 103. An axial pin 103e extending parallel to the rotational shaft 102 is fixed on the projection 103c, and a roller 103d is rotatably fitted on the axial pin 103e. The mirror drive lever 103 is always biased in the counterclockwise direction in FIG. 3 by a biasing member (not shown) such as a coil or torsion spring or the like.

The mirror drive gear 100 is provided with a mirror drive cam 100c formed integrally thereon. The mirror drive cam 100c has a cam surface 100b along its peripheral edge which comes into contact with the roller 103d. In the state shown in FIG. 3 the rotation of the mirror drive gear 100 in the counterclockwise direction in FIG. 3 makes the roller 103d pushed upwards by the cam surface 100b against the biasing force of the aforementioned biasing member that biases the mirror drive lever 103, to thereby rotate the mirror drive lever 103 in the clockwise direction in FIG. 3.

In the vicinity of the second motor 60 a shaft 65 extending in the horizontal direction of the camera 30 is rotatably supported. In the vicinity of the shaft 65 there are provided a condenser 62 used for a built-in strobe (not shown) of the camera 30 and a battery chamber 63 in which a battery (not shown), serving as an electrical source for the camera 30, is accommodated.

A pinion 65a which is engageable with the planet gear 75b is fixed on one end of the shaft 65, and a worm 65b is fixed on the other end of the shaft 65. The reduction gear train 70 is provided in the vicinity of the worm 65b, and a rotation of the worm 65b is transmitted, through the reduction gear train 70, to a spool gear 35a which is formed integral with the film take-up spool 35 at the lower end thereof and which rotates together with the film take-up spool 35. The reduction gear train 70 consists of first, second and third composite gears 70a, 70b and 70c, respectively, each having a small gear and a large gear. The large gear of the first composite gear 70a is formed as a worm wheel 70d that remains in mesh with the worm 65b. The small gear 70e of the third composite gear 70c remains in mesh with the spool gear 35a.

The planet gear 75b is engaged with the first gear 80a of the reduction gear train 80 when the rotational arm 75d is at its first position. The planet gear 75b is engaged with the pinion 65a when the rotational arm 75d is at its second position. The second motor 60, the pinion 65a, the shaft 65, the worm 65b, the reduction gear train 70, the spool gear 35a, etc. constitute a film take-up spool drive mechanism of the camera 30.

Figure 3:
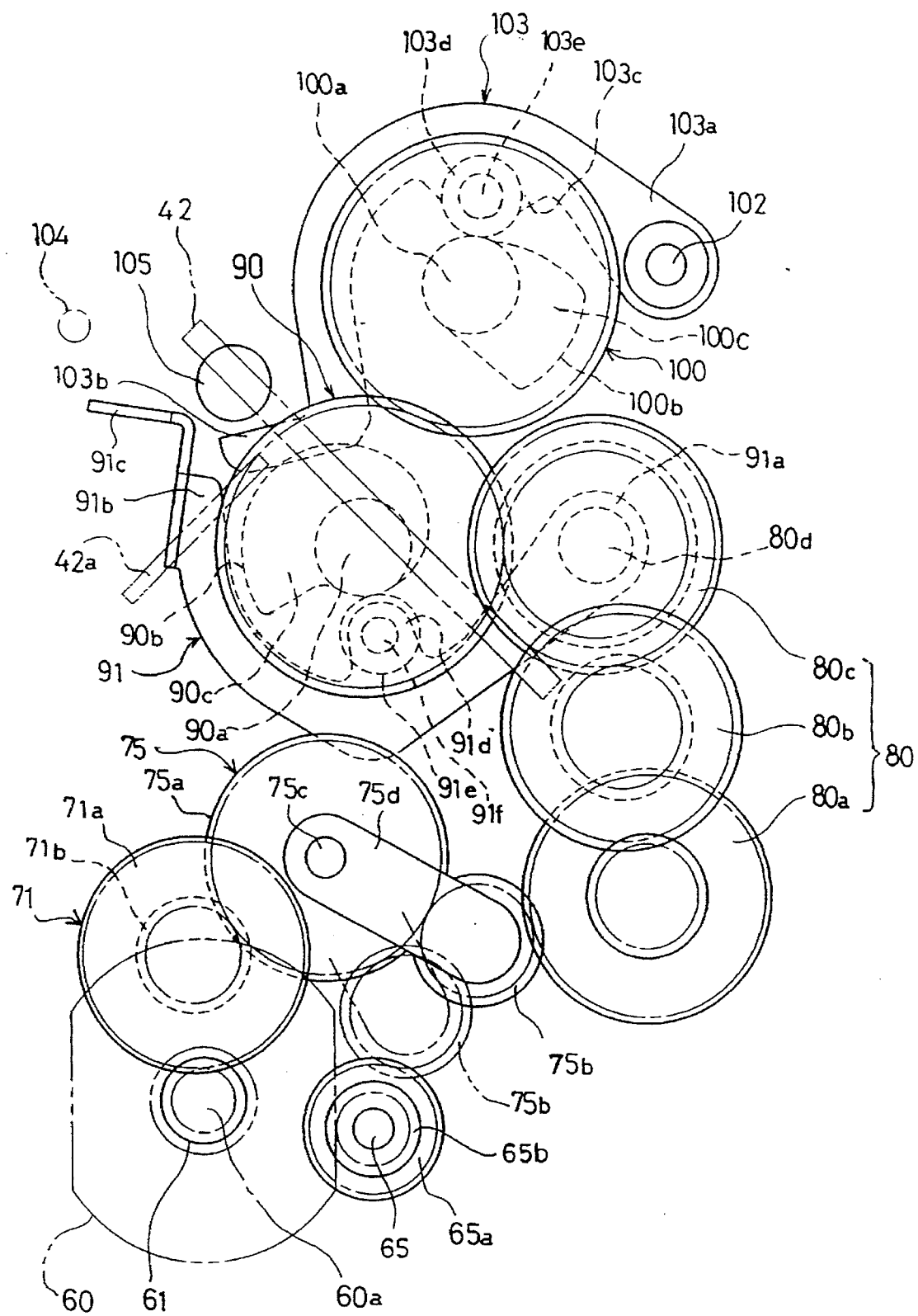
FIG. 3 is a plan view of a shutter charging mechanism and a mirror drive mechanism of the camera shown in FIGS. 1 or 2.

Due to the rotation transmitting mechanism of the second motor 60, having the structure mentioned above, when the rotational axis 60a of the second motor 60 rotates in one rotational direction (reverse direction, i.e., the counterclockwise direction in FIG. 3), the composite gear 71 rotates in the clockwise direction to thereby rotate the sun gear 75a in the counterclockwise direction, as viewed in FIG. 3. Due to this rotation of the sun gear 75a the rotational arm 75d rotates in the counterclockwise direction to reach its first position, so that the planet gear 75b rotating in the clockwise direction is brought into mesh with the first gear 80a, as viewed in FIG. 3. Therefore, as viewed in FIG. 3, a rotation of the planet gear 75b in the clockwise direction is transmitted to the shutter charging gear 90 and the mirror drive gear 100 through the reduction gear train 80, thereby the shutter charging gear 90 is rotated in the clockwise direction, so that the shutter charging lever 91 is rotated in the counterclockwise direction to thereby perform a shutter charge. At the same time, the mirror drive gear 100 is rotated in the counterclockwise direction by the rotation of the shutter charging gear 90, so that the mirror drive lever 103 is rotated in the clockwise direction, as viewed in FIG. 3. Due to this rotation of the mirror drive lever 103 in the clockwise direction, the engaging projection 103b first comes into contact with the mirror sheet pin 105 and subsequently lifts up the same, so that the quick-return mirror 42 is rotated about the shaft 104 in the counterclockwise direction and reaches its uppermost position.

The quick-return mirror 42 is provided on the rear surface thereof with a sub-mirror 42a. Part of the center of the object light passed through a photographic lens (not shown) is reflected on the sub-mirror 42a to be projected beneath the quick-return mirror 42 towards the AF sensor module 48 through the sub-mirror 42a. The sub-mirror 42a is retracted to the rear surface of the quick-return mirror 42 when the quick-return mirror 42 is positioned at its uppermost position.

On the other hand, when the rotational axis 60a of the second motor 60 rotates in the other rotational direction (forward rotational direction, i.e., the clockwise direction in FIG. 3), the composite gear 71 rotates in the counterclockwise direction to thereby rotate the sun gear 75a in the clockwise direction, as viewed in FIG. 3. Due to this rotation of the sun gear 75a the rotational arm 75d rotates in the clockwise direction to reach its second position, so that the planet gear 75b rotating in the counterclockwise direction is brought into mesh with the pinion 65b fixed on the shaft 65, as viewed in FIG. 3. Therefore, the rotation of the planet gear 75b in the counterclockwise direction in FIG. 3 is transmitted to the spool gear 35a through the pinion 65a, the shaft 65, the worm 65b and the reduction gear train 70 as noted above.

Figure 7:
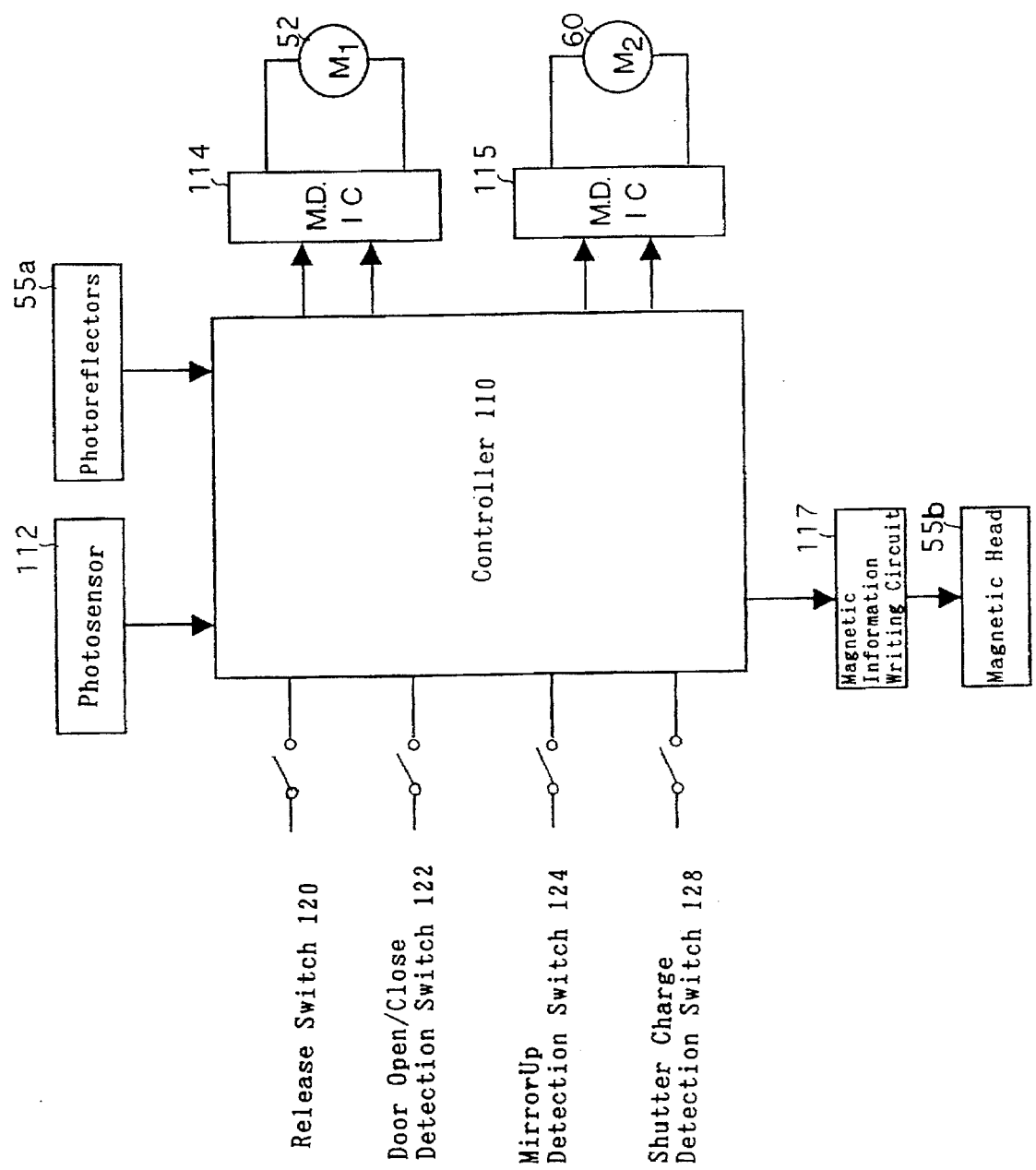
FIG. 7 is an electrical circuit provided in the camera shown in FIGS. 1 or 2.
Figure 8:
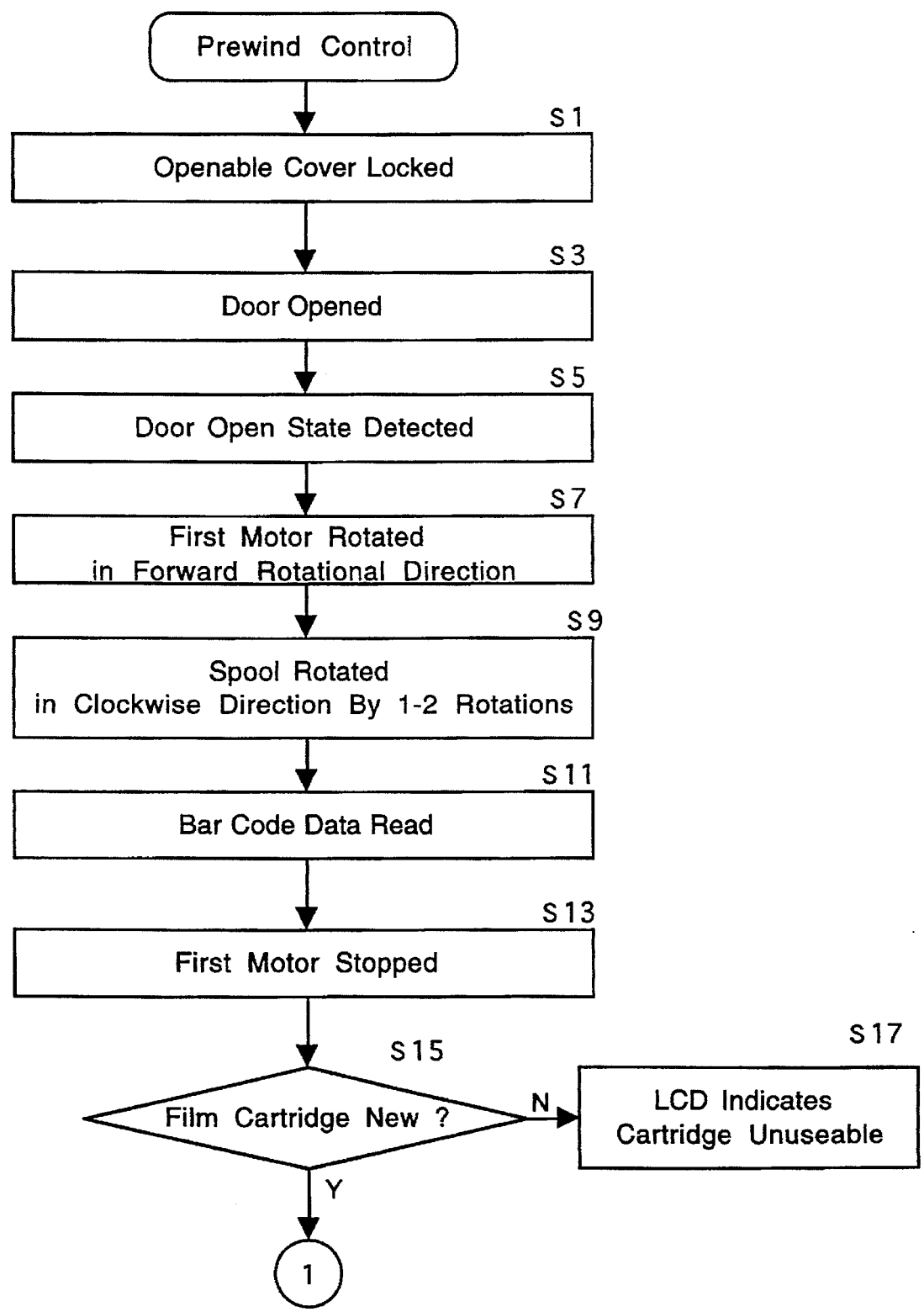
FIGS. 8 through 13 are flow charts illustrating operations of the camera shown in FIGS. 1 or 2.
Figure 9:
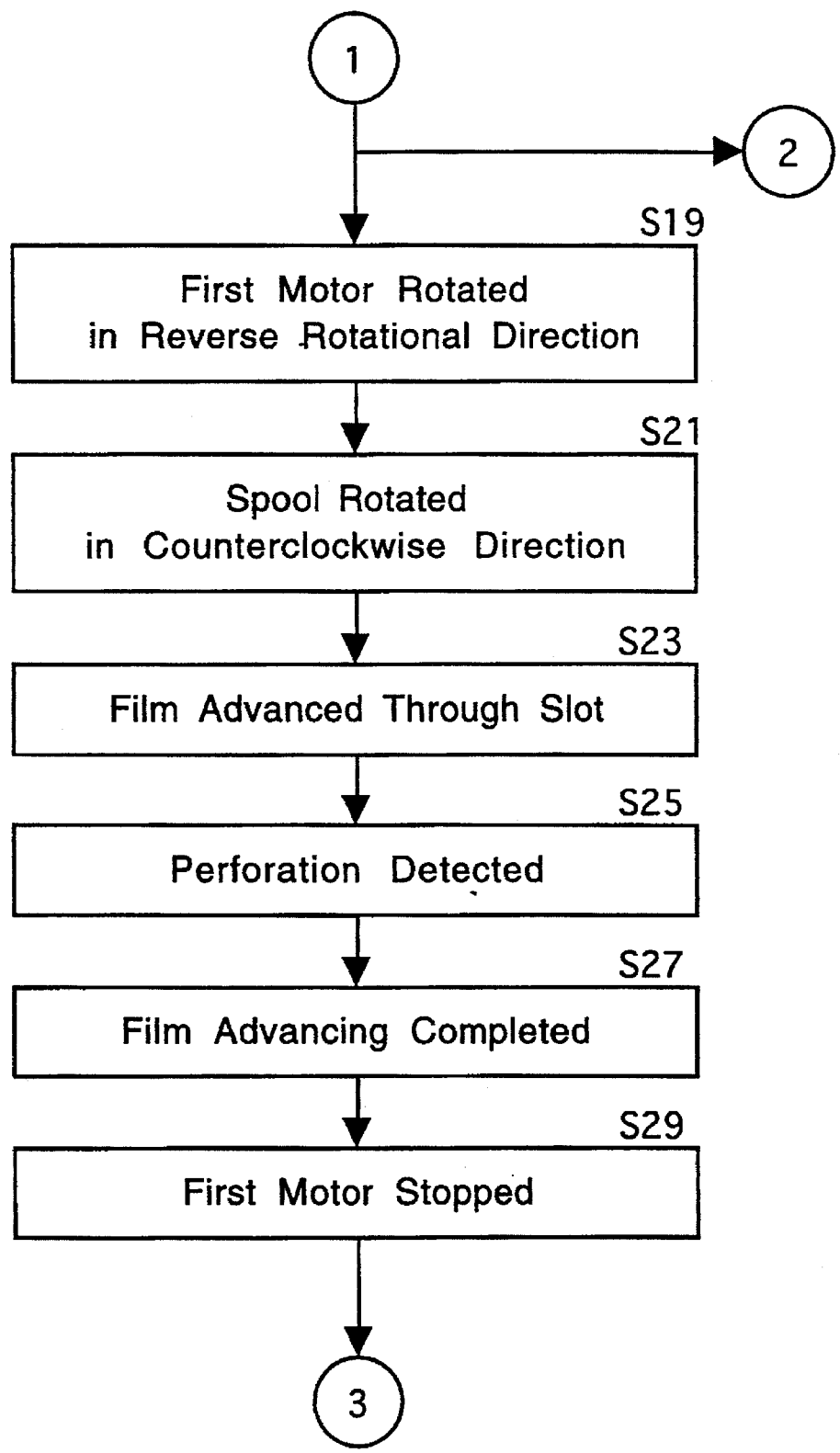
Figure 10:
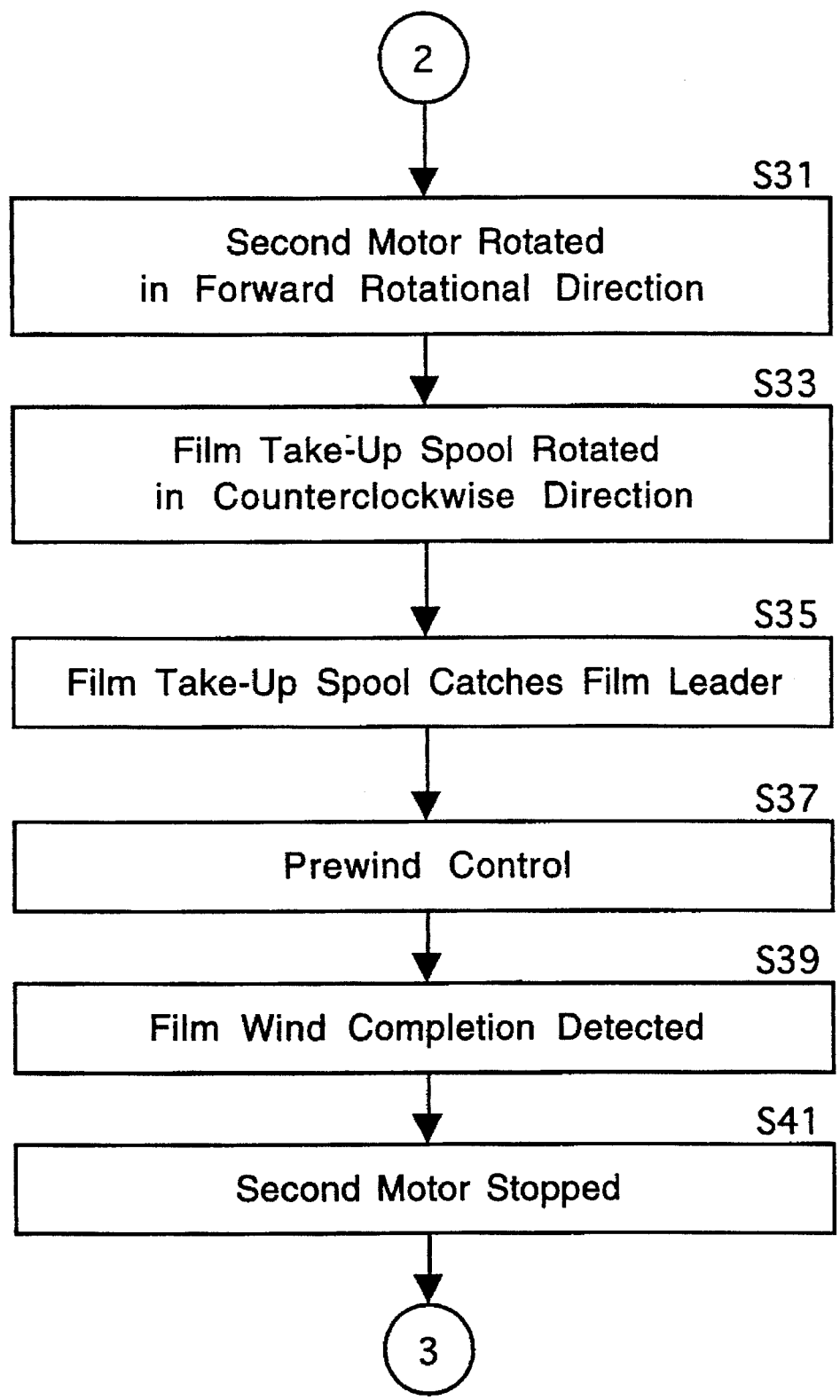
Figure 11:
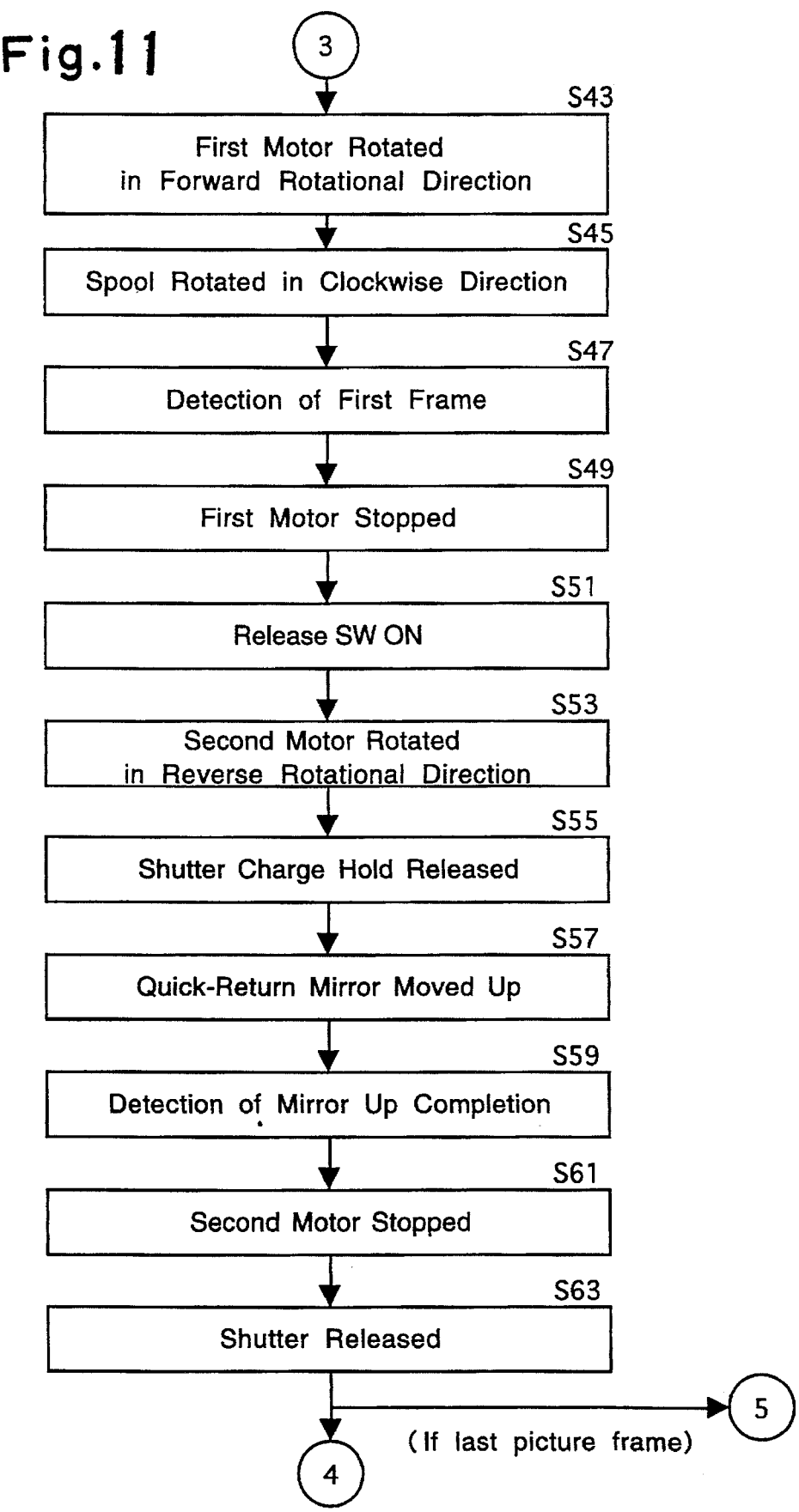
Figure 12:
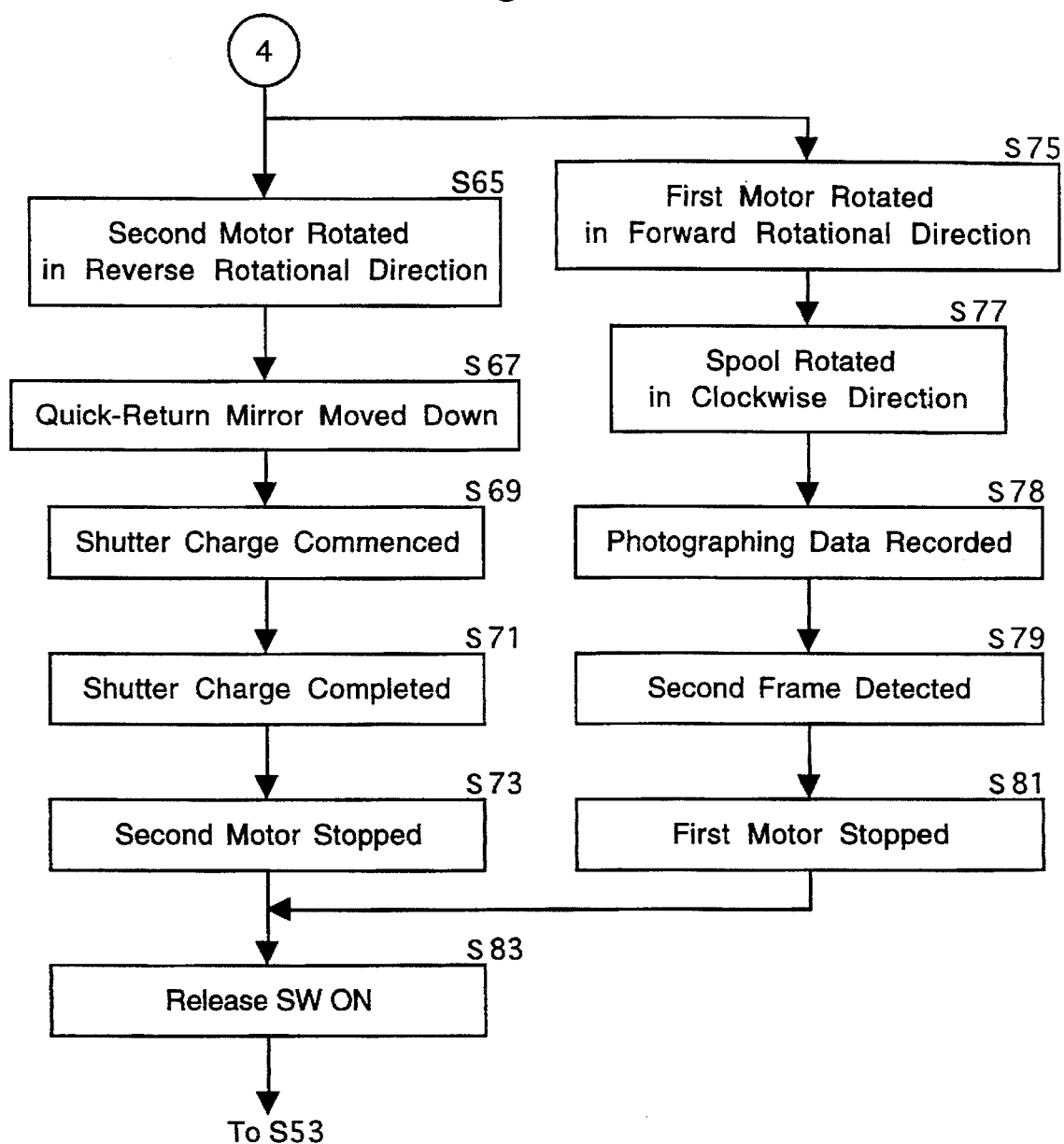
Figure 13:
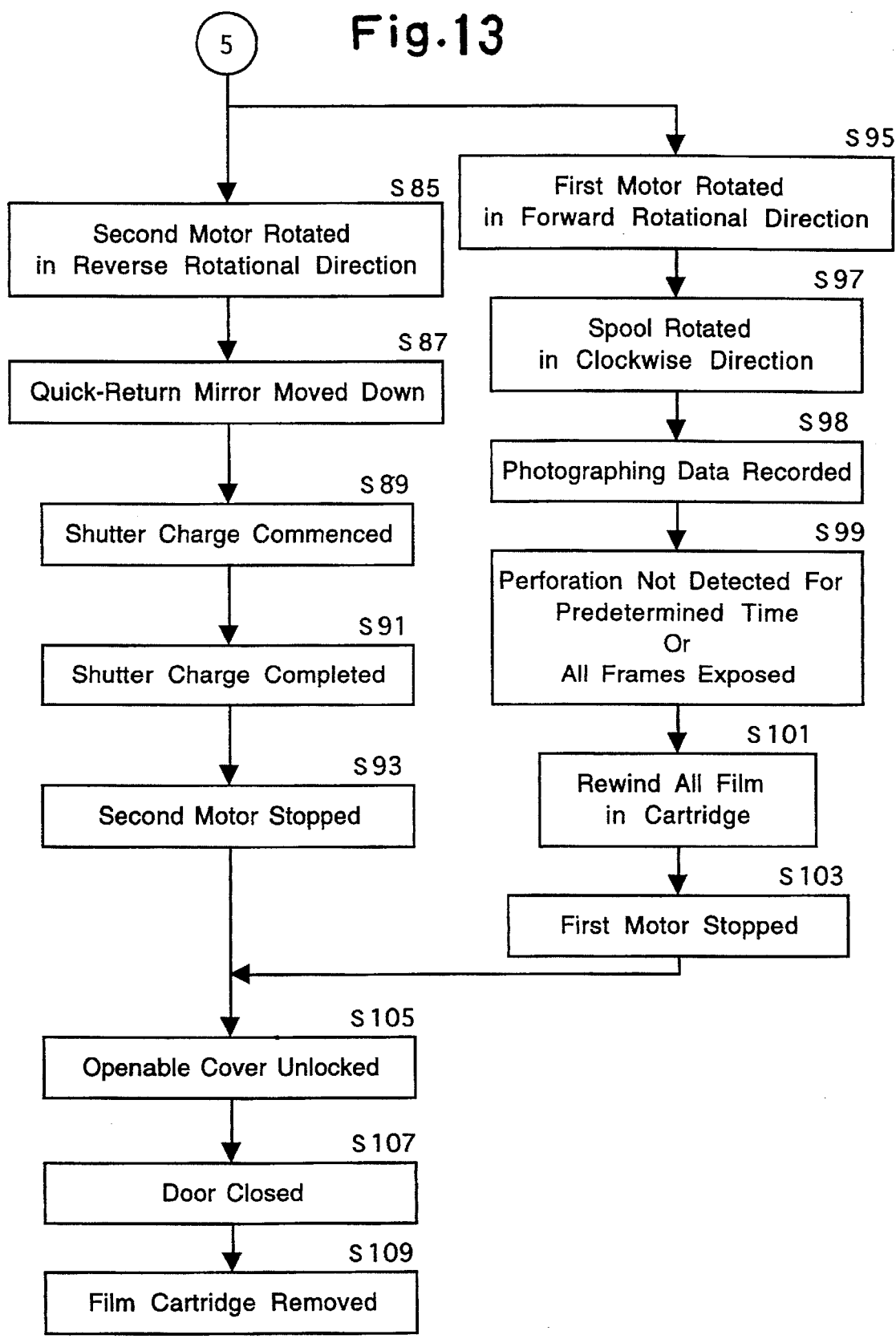

An electrical circuit block provided in the camera 30 will be hereinafter discussed with reference to FIG. 7.

The camera 30 is provided with a controller 110, which oversees the overall control of the camera 30. The photosensor 112 and the pair of photoreflectors 55a are electrically connected to the controller 110. The first and second motors 52, 60 are electrically connected to the controller 110 through respective motor drives IC 114, 115. The magnetic head 55b is also electrically connected to the controller 110 through a magnetic information writing circuit 117 provided in the camera 30.

A release switch 120, a door open/closed detection switch 122, a mirror up detection switch 124 and a shutter charge detection switch 128, are also electrically connected to the controller 110. The release switch 120 is linked to a release button 119 provided on an upper wall of the camera body 30a, so that the release switch 120 is closed when the release button 119 is fully depressed. The cover open/closed detection switch 122 is provided in the vicinity of the film chamber 33 for detecting whether the openable door 19 of the film cartridge 1 is open or closed. The mirror up detection switch 124 detects whether or not the quick-return mirror 42 is moved up to its uppermost position. The shutter charge detection switch 128 detects whether or not the shutter charge is completed.

The controller 110 supplies pulse current to the first motor 52 (PWM, i.e., pulse width modulation control) when the aforementioned film advancing operation is performed. On the other hand, the controller 110 supplies direct current to the first motor 52 when the aforementioned film winding operation is performed.

The camera 30 operates according to the flow charts shown in FIGS. 8 through 13. The controller 110 supplies pulse current to the first motor 52 only when the aforementioned film advancing operation is performed and supplies direct current to the first motor 52 when the first motor 52 needs to be actuated in other operations.

In a state where the main switch (not shown) of the camera 30 is ON, if the unexposed film cartridge 1 is inserted into the film chamber 33 in a predetermined direction in an appropriate way and the openable cover (not shown) for opening or closing the film chamber 33 is subsequently closed and locked (Step S1), the door 19 for opening or closing the slot 17 is opened through the aforementioned cartridge door drive mechanism (not shown) (Step S3). Detecting that the door 19 is opened through the door open/closed detection switch 122 (Step S5), the controller 110 actuates the first motor 52 to rotate its rotating shaft 52a in the forward rotational direction through the motor drive IC 114 so as to rotate the spool 11 in the clockwise direction, as viewed in FIG. 2, by one through two rotations through the planetary gear 56, the reduction gear train 59, the drive gear 58 and the spool drive fork 39 (Steps S7 and S9: disc member drive operation). Due to the rotation of the spool 11 the partial disc member 23 also rotates by the same amount of rotation. During the rotation of the partial disc member 23, the controller 110 reads the information (ISO speed, the number of exposures, etc.) of the bar code 26 from the partial disc member 23 through the photosensor 112 (Step S11). The rotation of the spool 11 in the clockwise direction, as viewed in FIG. 2, does not bring the film F, housed in the film cartridge 1, out of the film cartridge 1 through the slot 17.

Immediately after having completed reading the information of the bar code 26 the controller 110 controls the first motor 52 to stop (Step S13). The controller 110 has detected whether the film cartridge 1 is a new cartridge (unexposed) or a used cartridge (exposed or processed) through the photosensor 112 by detecting the initial position of the partial disc member 23 when the spool 11 is rotated at Step S9, and if the film cartridge 1 is detected to be a used cartridge the controller 110 actuates an LCD panel (not shown) provided on the camera 30 at an appropriate position, to visually indicate that the inserted film cartridge 1 is a used cartridge and thus cannot be used, and thereafter the controller 110 does not carry out the film loading or winding operation (Steps S15 and S17).

On the other hand, if the film cartridge 1 is detected to be a new cartridge the controller 110 actuates the first motor 52 to rotate the rotating shaft 52a thereof in the reverse rotational direction so as to rotate the final gear 54a in the clockwise direction in FIG. 2 (Steps S15 and S19: film advancing operation). In this film advancing operation, the controller 110 supplies pulse current to the motor drive IC 114 so as to pulse-drive the first motor 52, so that the rotating shaft 52a rotates intermittently or stepwisely. Therefore, the final gear 54a also rotates intermittently. This intermittent rotation of the final gear 54a is transmitted to the drive gear 58 through the planetary gear 56, so that the spool drive fork 39 is rotated in the counterclockwise direction, as viewed in FIG. 2, to thereby rotate the spool 11 in the same direction, which makes the film F come out of the slot 17 (Steps S21 and S23). The film F is advanced to the spool chamber 31 through the narrow film leading path between the pressure plate 55 and the aforementioned aperture frame (not show). Thereafter, the film take-up spool 35 catches the leader of the film F and starts winding the film F through the operations at Steps S31 through S37 noted below, and thereafter, when detecting the perforation of the film F through the pair of photoreflectors 55a the controller 110 assumes that the leader of the film F has been properly engaged with the film take-up spool 35 (that is, an initial film advancing operation has been completed) and stops the first motor 52 (Steps S25, S27 and S29). Thereafter, control proceeds to Step S43. It should be understood that the operations shown in the flow charts of FIGS. 9 and 10, namely Steps S19 through S29, and Steps S31 through S41 are performed simultaneously.

The controller 110 actuates the second motor 60 to rotate the rotating shift 60a thereof in the forward rotational direction (in the clockwise direction in FIG. 3), at the same time the rotating shaft 52a of the first motor 52 starts to be rotated in the reverse direction for the film advancing operation at Step S19 (Step 31: the film winding operation). This rotation of the rotating shaft 60a in the forward rotational direction is transmitted to the spool gear 35a to rotate the same in the counterclockwise direction, as viewed in FIG. 2, through the composite gear 71, the planetary gear 75, the pinion 65a, the shaft 65, the worm 65b and the reduction gear train 70, so that the film take-up spool 35 is rotated in the counterclockwise direction in FIG. 2 (Step S33). Thereafter, when the leader of the film F reaches the position where the leader is engaged with the film take-up spool 35, due to the rotation of the first motor 52 in the operations at Steps S19, S21 and S23, the film take-up spool 35 catches the leader (Step S35) and winds up the film F (Step S37: prewind control). Thereafter, detecting that the film F stops moving (i.e., the film winding operation is completed) through the pair of photoreflectors 55a, the controller 110 stops the second motor 60 (Steps S39 and S41). Thereafter, control proceeds to Step S43. At Step S39, although the controller 110 detects that the film winding operation is completed through the pair of photoreflectors 55a, the controller 110 may instead detect that the film winding operation is completed through the photosensor 112 by detecting a state in which the partial disc member 23 is not being rotated.

Furthermore, after the operation of Step S37, instead of performing the subsequent operations at Steps S39 and S41, the controller 110 may stop the second motor 60 upon detecting, through the pair of photoreflectors 55a, that the film F has been wound by a predetermined amount corresponding to all the frames of the film F, i.e., the number of exposures of the film F. The number of exposures of the film F is read as input data at Step S11.

The controller 110 controls the first motor 52 with pulse current in the film advancing operation at Step S19, whereas at Step S31 the controller 110 controls the second motor 60 with direct current in the film winding operation, which starts to be performed at the same time the film advancing operation commences. Due to this control, the film winding speed FWS (i.e., the rotational speed of the film take-up spool 35) at Step S33 exceeds the film advancing speed FAS (i.e., the rotational speed of the spool 11). In other words, when the film advancing operation and the film winding operation are simultaneously performed, the controller 110 controls the first and second motors 52, 60 such that the film winding speed FWS exceeds the film advancing speed FAS. Therefore, when the film F is wound by a rotation of the film take-up spool 35 at Step S37 (i.e., in the prewind control), the spool 11 is forced to rotate at a rotational speed corresponding to that of the film take-up spool 35 on account of the film winding speed FWS being faster than the film advancing speed FAS.

During the time the film advancing operation and the film winding operation are simultaneously performed, since the rotational speed of the drive gear 58, which rotates together with the spool 11, exceeds the rotational speed of the planet gear 56b, rotated by the pulse-driven first motor 52, the planet gear 56b cannot become engaged with the drive gear 58, but is thrown or kicked back in the clockwise direction, as viewed in FIG. 2, about the sun gear 56a upon contacting the drive gear 58, even though the planet gear 56b revolves about the sun gear 56a in the counterclockwise direction, as viewed in FIG. 2, while rotating about its axis in the clockwise direction, in FIG. 2, so as to be engaged with the drive gear 58. Immediately after the planet gear 56b is kicked back by the drive gear 58, the planet gear 56b again approaches towards the drive gear 58 while revolving about the sun gear 56a in the counterclockwise direction, as viewed in FIG. 2. However, since the rotational speed of the drive gear 58 exceeds the rotational speed of the planet gear 56b, the planet gear 56b is again kicked back and revolves back about the sun gear 56 in the clockwise direction, as viewed in FIG. 2. Therefore, the planet gear 56b, that rotates about its axis in the clockwise direction in FIG. 2, revolves back and forth about the sun gear 56a by being kicked back intermittently by the drive gear 58. This action of the planet gear 56b being kicked back intermittently by the drive gear 58 occurs during the film winding operation (in the prewind control) and comes to an end when the first motor 52 stops at Step S29. When the action ends, the planet gear 56b stops at a neutral position where the planet gear 56b is not in mesh with either the drive gear 58 or the small gear 59a.

At Step S43 the controller 110 actuates the first motor 52 to rotate the rotating shaft 52a thereof in the forward rotational direction so as to rewind the film F in the film cartridge 1 by rotating the spool 11 in the clockwise direction in FIG. 2 (Step S45), and subsequently, the controller 110 stops the first motor 52 upon detecting that the first frame of the film F is positioned to correspond to the photographic aperture (Steps S47 and S49). Now the film loading operation of the camera 30 is completed.

After the completion of the film loading operation, if the release button 119 is fully depressed by a photographer, the release switch (SW) 120 is turned ON (Step S51). When the release switch 120 is turned ON the controller 110 actuates the second motor 60 to rotate the rotating shaft 60a thereof in the reverse rotational direction (Step S53), and subsequently release holding the shutter charge in the shutter blade driver 50b (Step S55). The reverse rotation of the rotating shaft 60a is transmitted to the mirror drive gear 100 through the output pinion 61, the composite gear 71, the sun gear 75a, the rotational arm 75d, the planet gear 75b, the reduction gear train 80 and the shutter charging gear 90, so that the mirror drive gear 100 rotates in the clockwise direction in FIG. 3 to thereby lift the roller 103d by the mirror drive cam 100c, and thus, the mirror drive lever 103 rotates in the clockwise direction in FIG. 3, which makes the quick-return mirror 42 move up through the mirror sheet pin 105 and the engaging projection 103 (Step S57: the quick-return mirror up operation). Upon detecting the completion of the upward movement of the quick-return mirror 42 through the mirror up detection switch 124 (Step S59), the controller 110 stops the second motor 60 (Step S61), and subsequently actuates the shutter blade driver 50b to release the shutter for exposure (Step S63: first frame exposure).

After this exposure is completed, the controller 110 again actuates the second motor 60 to rotate the rotating shaft 60a thereof in the reverse direction so as to move down the quick-return mirror 42 by rotating the mirror drive gear 100 (Steps S65 and S67: the quick-return mirror down operation). At the same time, due to the rotation of the shutter charging gear 90, the roller 91e is pushed downwards by the charging cam 90c, thereby the shutter charging lever 91 rotates in the counterclockwise direction in FIG. 3 to thereby perform a shutter charge (Step S69: the shutter charge operation). When the shutter charge is completed the controller 110 stops the second motor 60 (Steps S71 and S73).

After the exposure is completed at Step S63, the controller 110 actuates the first motor 52 to rotate the rotating shaft 52a thereof in the forward rotational direction (Step S75) so as to rewind the film F in the film cartridge 1 by rotating the spool 11 in the clockwise direction in FIG. 2 (Step S77: the film rewinding operation), at the same time the rotating shaft 60a of the second motor 60 is rotated in the reverse direction at Step S65. During the film rewinding operation, the controller 110 controls the magnetic information writing circuit 117 to record the photographic data (shutter speed data, aperture value data, brightness value data, strobe data, date, etc.) regarding the first exposed frame on the magnetic layer of the film F that corresponds to the first exposed frame through the magnetic head 55b (Step S78).

Thereafter, the controller 110 stops the first motor 52 upon detecting that the second frame of the film F is positioned to correspond to the photographic aperture (Steps S79 and S81). Therefore, the second frame of the film F is ready to be exposed at Step S81.

Thereafter, the operations from Step S53 to Step S81 are performed each time a picture is taken, i.e., each time the release button 119 is fully depressed. However, in the case where the exposure at Step S63 is for the last frame of the film F, the operations at and after Step S85 are performed after the operation at Step S63.

The operations at Steps S85 through S93 are identical to those at Steps S65 through S73. After the exposure is completed at Step S63, the controller 110 actuates the first motor 52 to rotate the rotating shaft 52a thereof in the forward rotational direction (Step S95) so as to rewind the film F in the film cartridge 1 by rotating the spool 11 in the clockwise direction in FIG. 2 (Step S97), at the same time the rotating shaft 60a of the second motor 60 is rotated in the reverse direction at Step S85. During the film rewinding operation the controller 110 controls the magnetic information writing circuit 117 to record the photographic data regarding the last exposed frame on the magnetic layer of the film F that corresponds to the last exposed frame through the magnetic head 55b (Step S98).

Thereafter, the controller 110 continues to rotate the rotating shaft 52a of the first motor 52 for a predetermined period of time so as to rewind all the film F in the film cartridge 1, in the case when no perforation of the film F is detected through the pair of reflectors 55a for a predetermined period of time or the case when all the frames of the film F have been exposed (Steps S99 and S101). After rotating the rotating shaft 52a of the first motor 52 for the predetermined period of time, the controller 110 stops the first motor 52 (Step S103). Thereafter, when the openable cover for opening or closing the film chamber 33 is unlocked (Step S105), the door 19 of the film cartridge 1 is closed through the aforementioned cartridge door drive mechanism (Step S107). In this state the film cartridge 1 can be taken out of the film chamber 33 (Step S109).

Although the second motor 60 is provided in the camera 30 below the shutter blade driver 50b such that the rotating shaft 60a thereof extends along the film moving direction of the film F, i.e., a horizontal direction of the camera 30, the second motor 60 may instead be provided in the camera 30 above the shutter blade driver 50b such that the rotating shaft 60a thereof extends along the film moving direction of the film F.

According to the camera 30, the film winding/rewinding operations, shutter charge operation and quick-return mirror up/down operations, which are all to be performed in the camera 30, are efficiently and effectively allocated to only two motors, i.e., the first and second motors 52 and 60, which are space-efficiently disposed in the camera 30, thus realizing a small and compact camera.

Furthermore, since the controller 110 controls the first and second motors 52, 60 such that the film winding speed FWS exceeds the film advancing speed FAS, when the film advancing operation and the film winding operation are simultaneously performed, it is not necessary to provide a mechanical interlocking mechanism which mechanically connects between the film advancing mechanism and the film take-up spool drive mechanism for mechanically off-setting the difference in speed between the film advancing speed FAS and the film winding speed FWS.

The camera 30 in the above described embodiment adopts the prewind control but may adopt the regular wind control instead. In such a case, the film F is wound by one picture frame through a rotation of the film take-up spool 35, each time a picture is taken, and all the film F is rewound in the film cartridge 1 when all the frames of the film F have been exposed.

Figure 14:
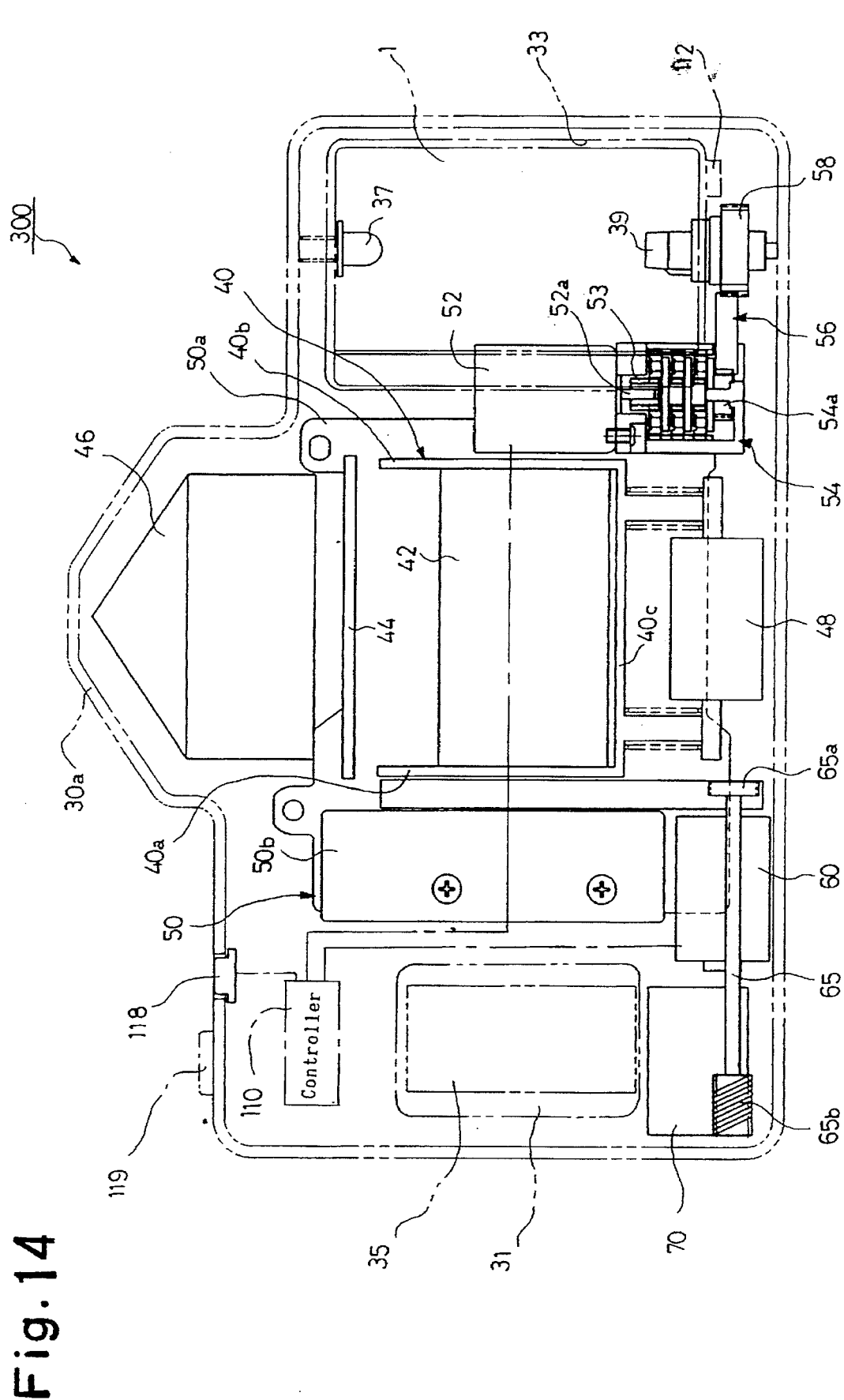
FIG. 14 is a front elevational view showing an inner structure of a motor-driven SLR camera to which a second aspect of the present invention is applied.
Figure 15:
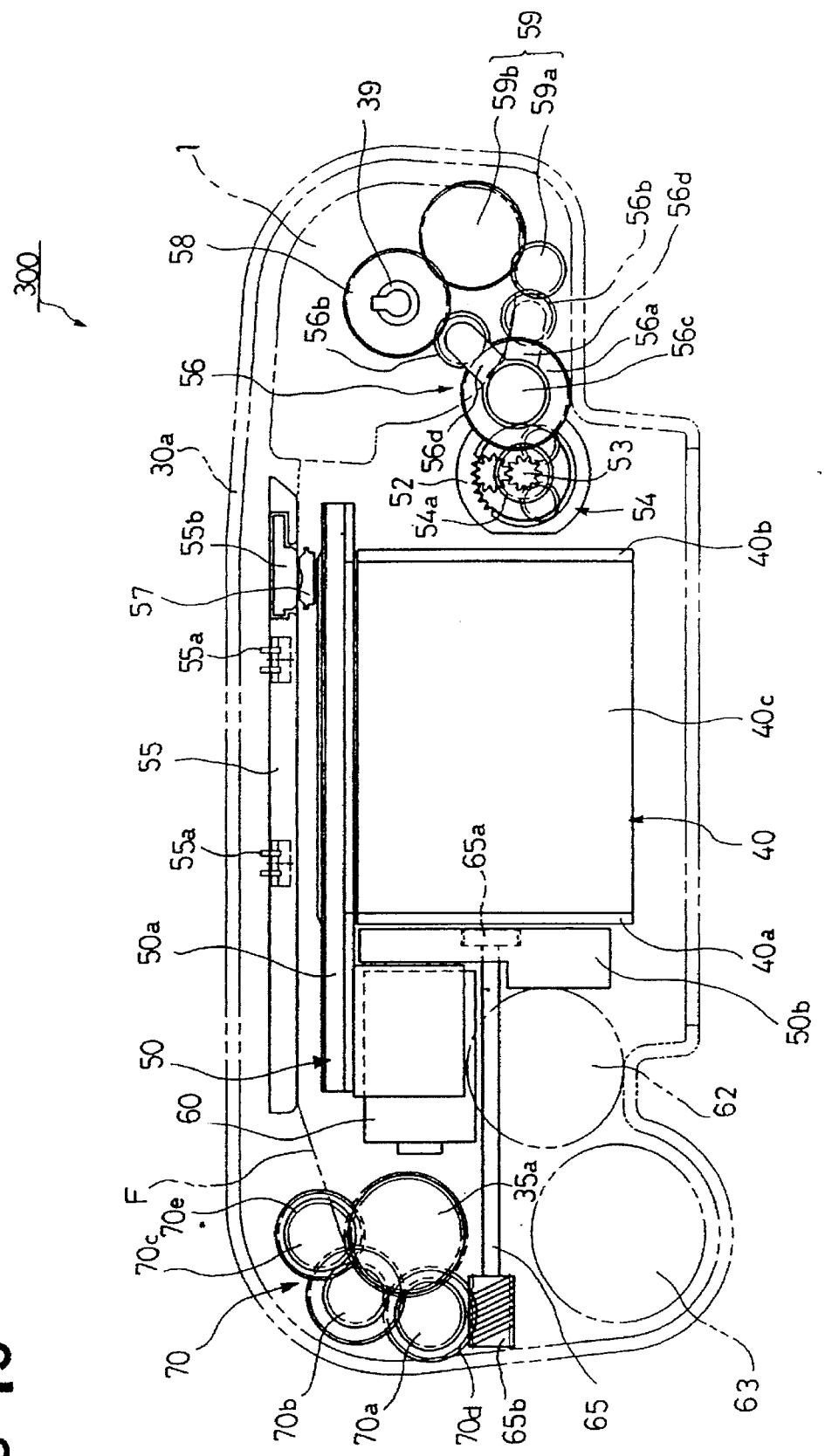
FIG. 15 is a plan view of the camera shown in FIG. 14.

Another embodiment (second embodiment) of the camera to which another aspect of the present invention is applied will be hereinafter discussed with reference to FIGS. 14 through 20. The camera 300 shown in FIGS. 14 or 15 is identical to the camera 30 of the above first embodiment, except that the camera 300 has some additional features. Therefore, only the additional features of the camera 300 will be hereinafter explained.

The camera 300 is provided with a winding control selecting device which allows a photographer to optionally select between the regular wind control and the prewind control, which is the main feature of the camera 300 of this embodiment.

Figure 16:
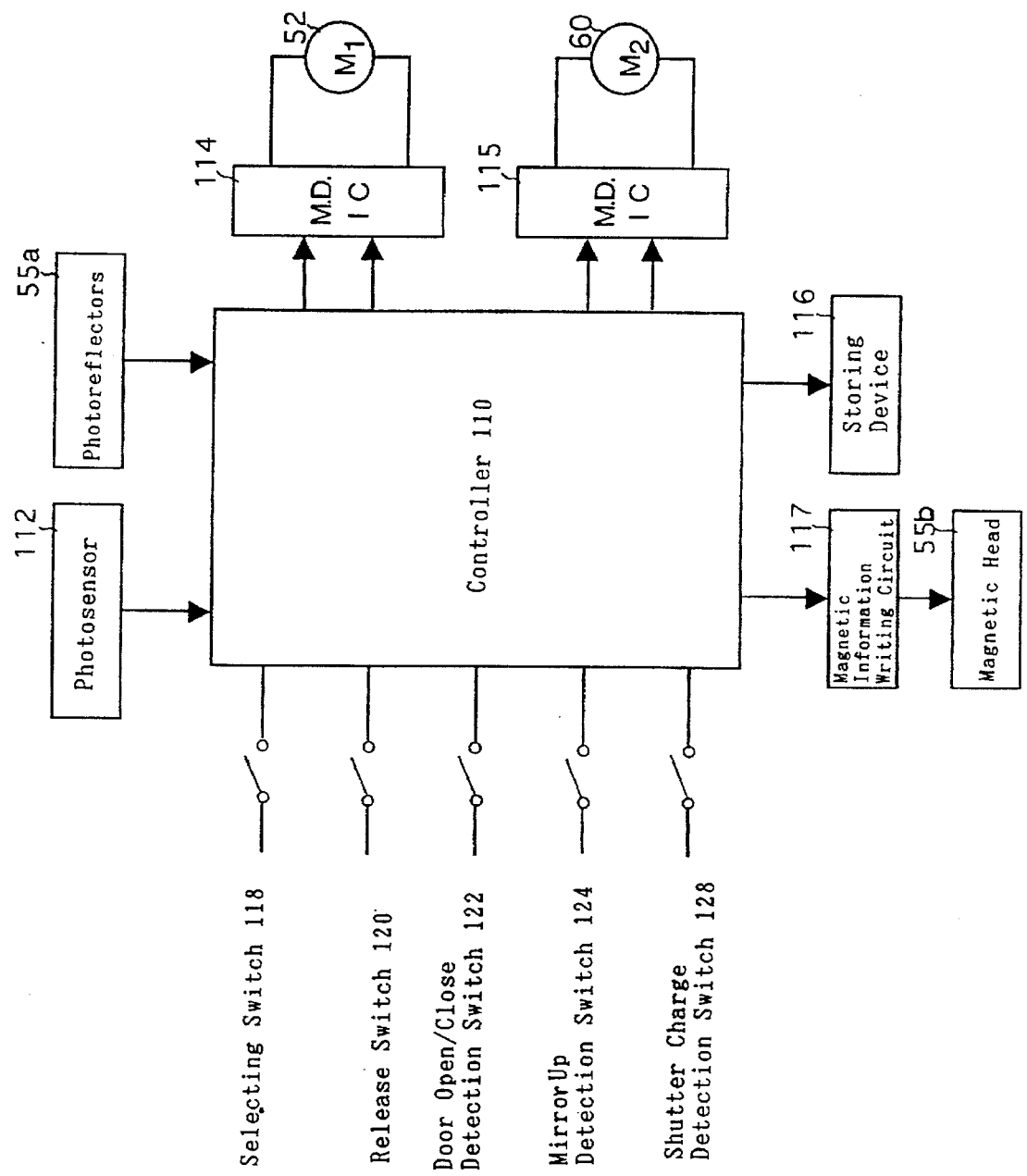
FIG. 16 shows an electrical circuit provided in the camera shown in FIGS. 14 or 15.

As shown in FIG. 16, in the camera 300 of this embodiment, a selecting switch 118 and a storing device 116 are further connected to the controller 110, which functions as a motor control device or a recording control device in this embodiment. The selecting switch 118 is provided on an upper wall of the camera body 30a in the vicinity of the release button 119, for selecting between the regular wind control and the prewind control. The storing device 116 may be in the form of RAM to store the photographic data regarding each frame of the film F, each time a picture is taken.

The prewind control performed in the camera 300 is identical to that performed in the camera 30 shown in FIGS. 8 through 13. However, in the camera 300, when the main switch (not shown) of the camera 300 is turned ON, either the regular wind control or the prewind control has been initially set, e.g., the prewind control has been initially set. Thereafter, in the state where there is no film cartridge in the film chamber 33, the regular wind control and the prewind control are alternately switched and selected every time the selecting switch 118 is depressed. Therefore, a photographer can select either the regular wind control or the prewind control at this stage. Once a new film cartridge 1 is inserted into the film chamber 33 and the openable cover for covering the film chamber 33 is locked, the controller 110 does not permit a change of the selected wind control, even if the selecting switch 118 is depressed. In the case where the prewind control is selected, control starts from Step S1.

Figure 17:
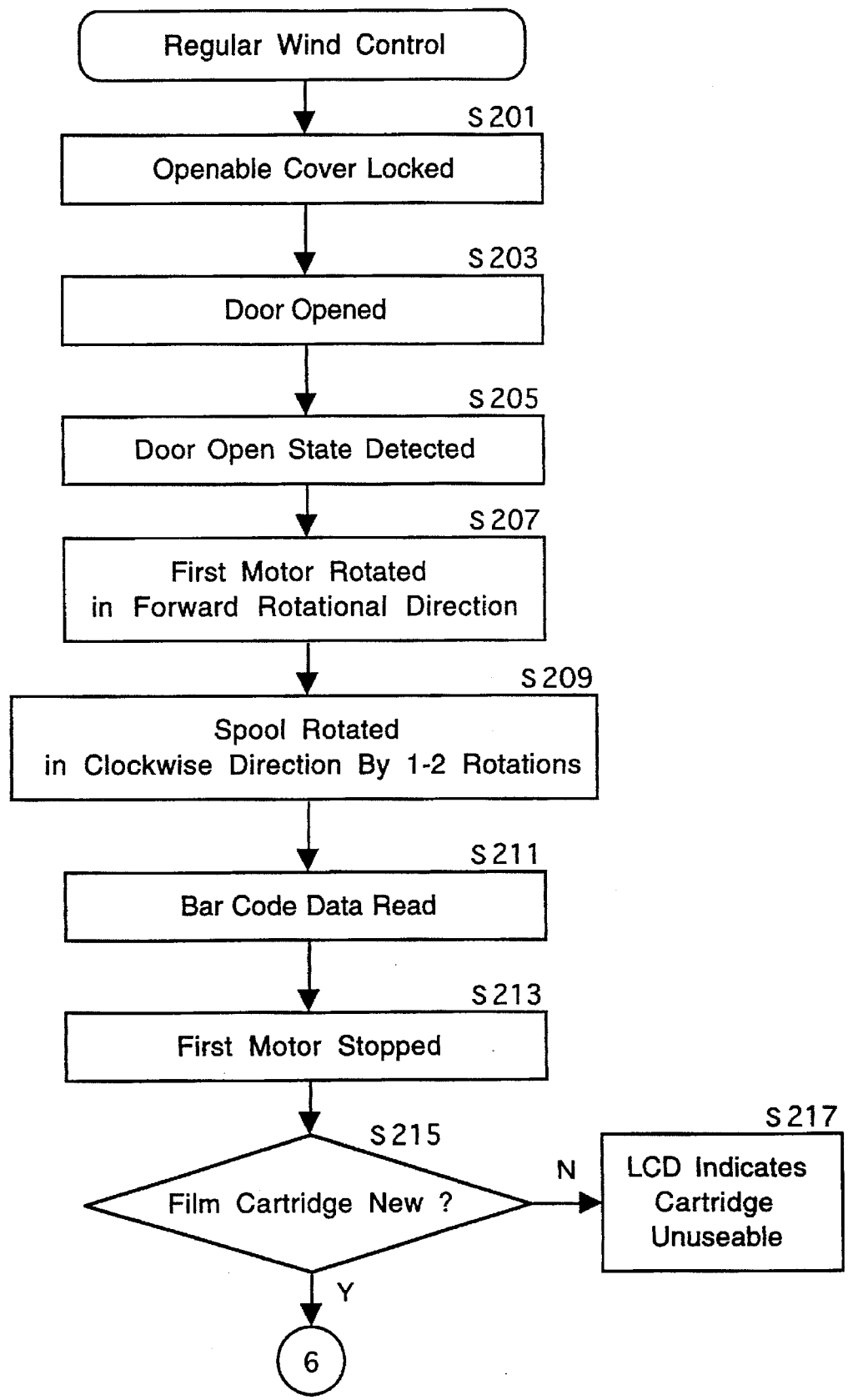
FIGS. 17 through 20 are flow charts illustrating operations of the camera shown in FIGS. 14 or 15.
Figure 18:
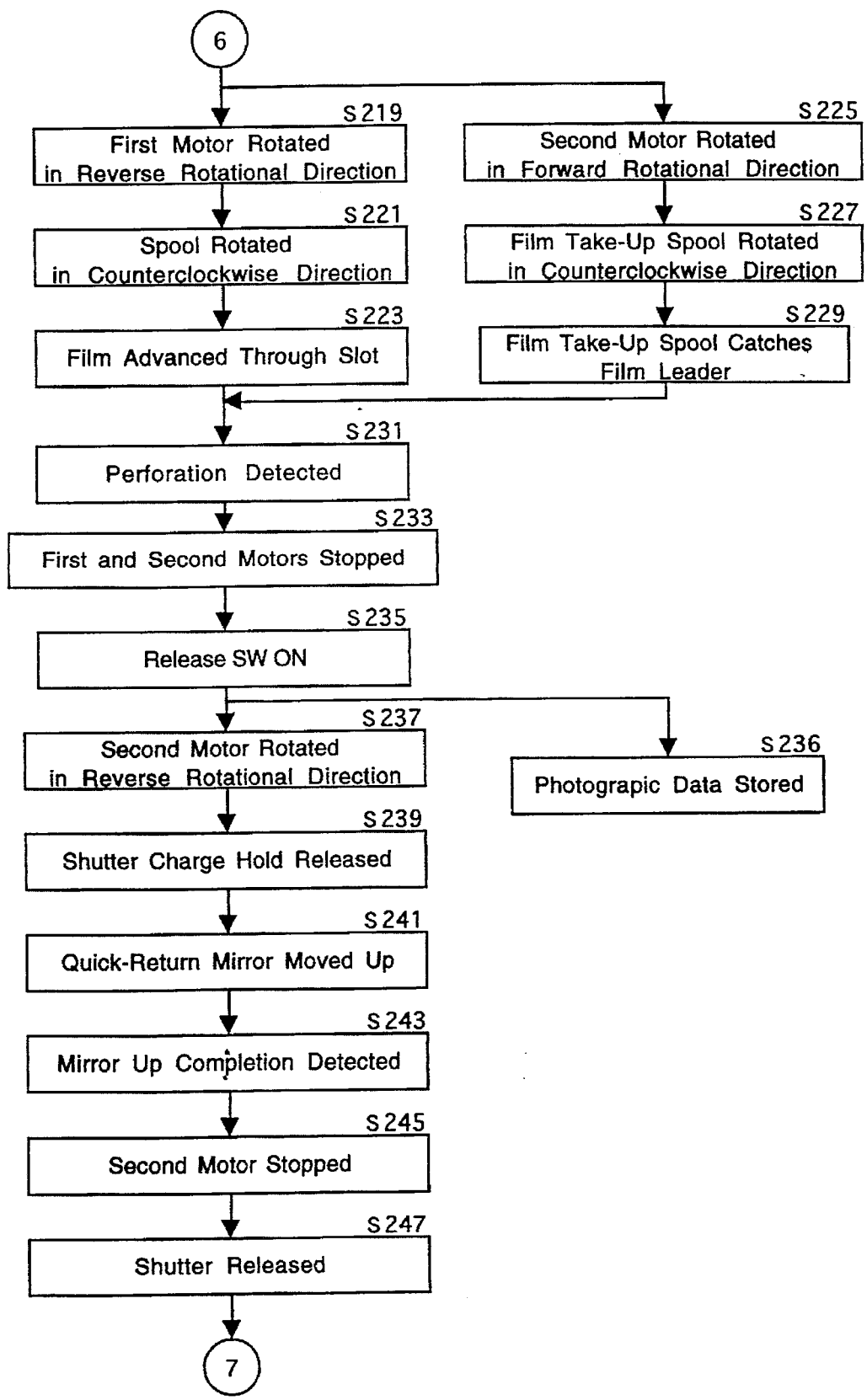

On the other hand, in the case where the regular wind control is selected, instead of starting from Step S1, control starts from Step S201 shown in FIG. 17. The operations at Steps S201 through S217 are identical to those at Steps S1 through S17 of the first embodiment, thus no explanation will be given.

If at Step S215 it is detected that the film cartridge 1 is a new cartridge, the controller 110 actuates the first motor 52 to rotate the rotating shaft 52a thereof in the reverse rotational direction so as to rotate the final gear 54a in the clockwise direction in FIG. 15 (Steps S215 and S219: film advancing operation). The rotation of the final gear 54a is transmitted to the drive gear 58 through the planetary gear 56, so that the spool drive fork 39 is rotated in the counterclockwise direction in FIG. 15, to thereby rotate the spool 11 in the same direction, which makes the film F come out of the slot 17 (Steps S221 and S223). The film F is advanced to the spool chamber 31 through the narrow film leading path between the pressure plate 55 and the aforementioned aperture frame (not shown). Thereafter, control proceeds to Step S231.

The controller 110 actuates the second motor 60 to rotate the rotating shaft 60a thereof in the forward rotational direction (in the clockwise direction in FIG. 3) at the same time the rotating shaft 52a of the first motor 52 starts to be rotated in the reverse direction for the film advancing operation at Step S219 (Step S225: the film winding operation). As noted above, this rotation of the rotating shaft 60a in the forward rotational direction is transmitted to the spool gear 35a to rotate the same in the counterclockwise direction in FIG. 15 through the composite gear 71, the planetary gear 75, the pinion 65a, the shaft 65, the worm 65b and the reduction gear train 70, so that the film take-up spool 35 is rotated in the counterclockwise direction in FIG. 15 (Step S227). Thereafter, when the leader of the film F reaches the position where the leader is engaged with the film take-up spool 35 due to the rotation of the first motor 52 in the operations at Steps S219, S221 and S223, the film take-up spool 35 catches the leader (Step S229) and winds up the film F. Thereafter, control proceeds to Step S231.

After the operations at Steps S223 and S229, upon detecting the perforation of the film F through the pair of photo-reflectors 55a (Step S231) the controller 110 assumes that the first frame of the film F is positioned to correspond to the photographic aperture and stops both the first and second motors 52, 60 (Step S233). Now the film loading operation of the camera 300 is completed.

After the completion of the film loading operation, if the release button 119 is fully depressed by a photographer, the release switch (SW) 120 is turned ON (Step S235). When the release switch 120 is turned ON the controller 110 actuates the second motor 60 to rotate the rotating shaft 60a thereof in the reverse rotational direction (Step S237) and subsequently release a hold of the shutter charge in the shutter blade driver 50b (Step S239). The reverse rotation of the rotating shaft 60a is transmitted to the mirror drive gear 100 through the output pinion 61, the composite gear 71, the sun gear 75a, the rotational arm 75d, the planet gear 75b, the reduction gear train 80 and the shutter charging gear 90, so that the mirror drive gear 100 rotates in the clockwise direction in FIG. 3 to thereby lift the roller 103d by the mirror drive cam 100c, and thus, the mirror drive lever 103 rotates in the clockwise direction in FIG. 3, which makes the quick-return mirror 42 move up through the mirror sheet pin 105 and the engaging projection 103 (Step S241: the quick-return mirror up operation). Upon detecting the completion of the upward movement of the quick-return mirror 42 through the mirror up detection switch 124 (Step S243), the controller 110 stops the second motor 60 (Step S245) and subsequently actuates the shutter blade driver 50b to release the shutter for exposure (Step S247: first frame exposure). At the same time the rotating shaft 60a of the second motor 60 is rotated in the reverse rotational direction at Step S237 the controller 110 stores the photographic data regarding the frame of the film F exposed at Step S247 in a corresponding portion in the storing device 116 (Step S236).

After the exposure is completed at Step S247, the controller 110 again actuates the second motor 60 to rotate the rotating shaft 60a thereof in the reverse direction so as to move down the quick-return mirror 42 by rotating the mirror drive gear 100 (Steps S249 and S251: the quick-return mirror down operation). At the same time, due to the rotation of the shutter charging gear 90 the roller 91e is pushed downwards by the charging cam 90c, thereby the shutter charging lever 91 rotates in the counterclockwise direction in FIG. 3 to thereby perform a shutter charge (Step S253: the shutter charge operation). When the shutter charge is completed the controller 110 stops the second motor 60 (Steps S255 and S257).

Immediately after the operation at Step S257 the controller 110 actuates the second motor 60 to rotate the rotating shaft 60a thereof in the forward rotational direction so as to wind the film F in the spool chamber 31 by rotating the film take-up spool 35 in the counterclockwise direction in FIG. 3 (Step S261). Thereafter, the controller 110 stops the second motor 60 upon detecting that the second frame of the film F is positioned to correspond to the photographic aperture (Steps S263 and S265). Hence, the second frame of the film F is ready to be exposed at Step S265. Thereafter, the operations from Step S237 to Step S265 are performed each time a picture is taken, i.e., the release button 119 is fully depressed.

Figure 20:
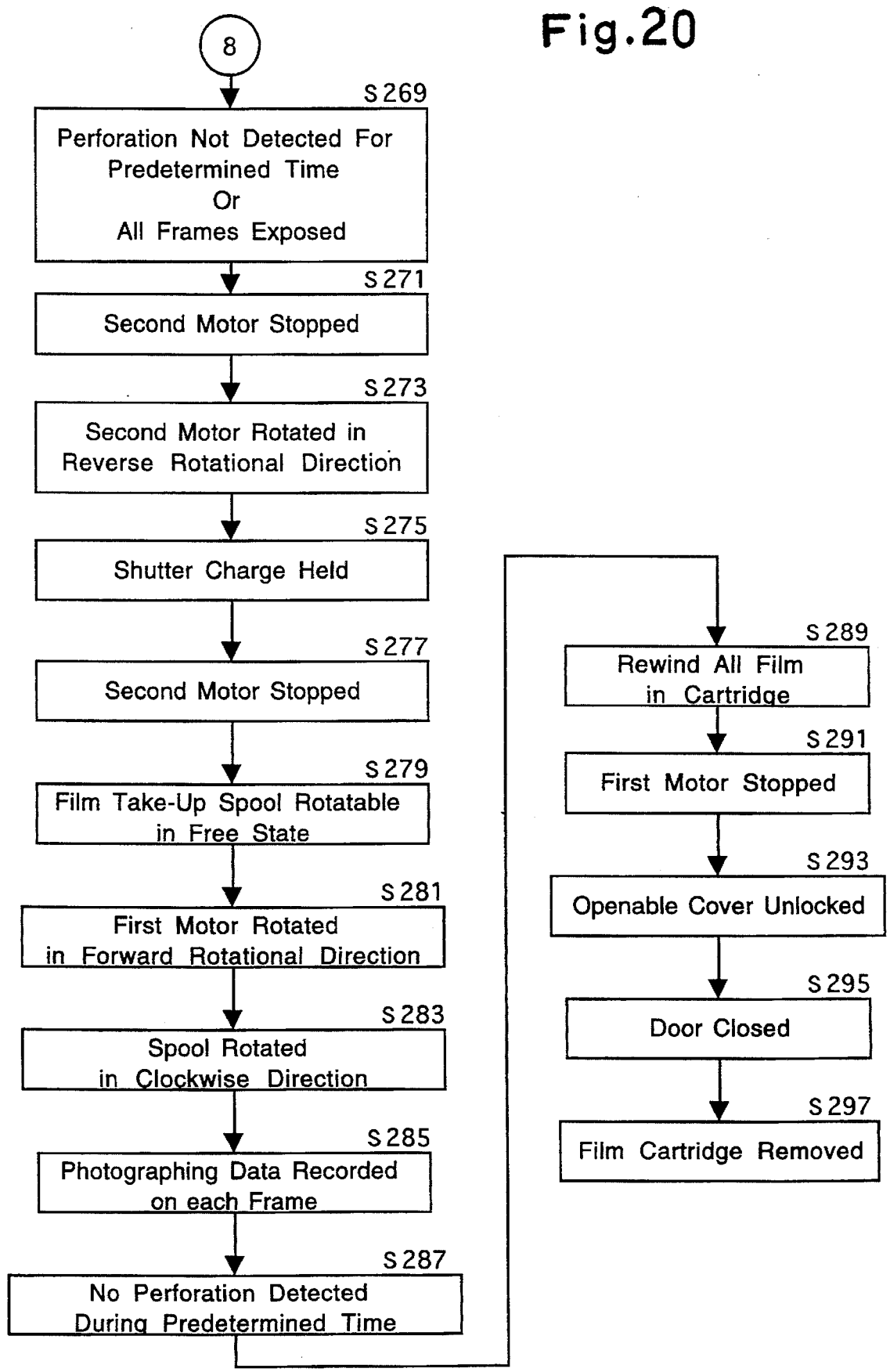
Figure 19:
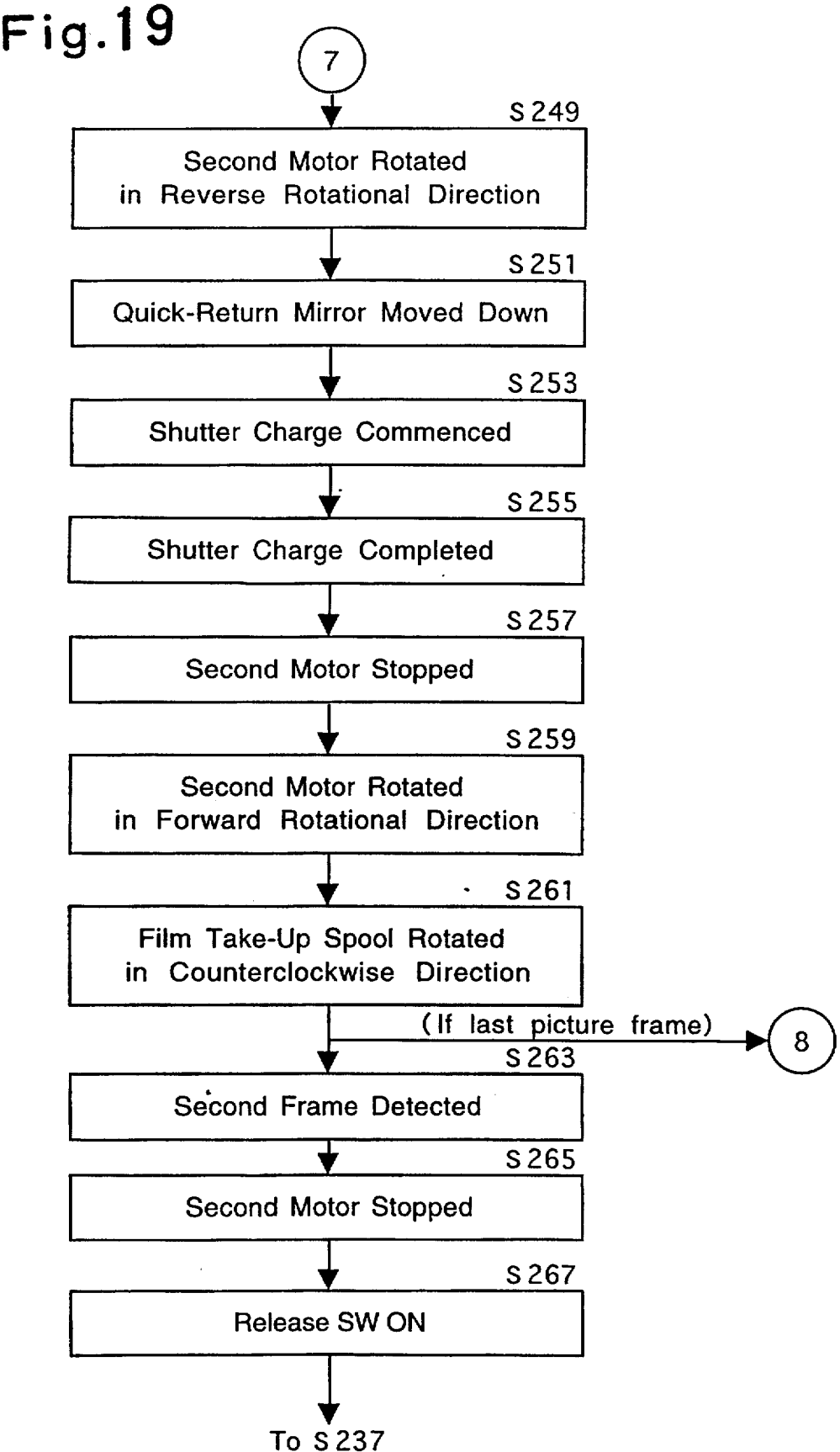

However, the operations at and after Step S269 shown in FIG. 20 are operated after the operation at Step S261 in the case when no perforation of the film F is detected through the pair of reflectors 55a for a predetermined period of time when the film take-up spool 35 is rotated in the operation at Step S261 or the case when all the frames of the film F have been exposed. Namely, in the case when not detecting any perforation of the film F through the pair of reflectors 55a for a predetermined period of time when the film take-up spool 35 is rotated in the operation at Step S261 or the case when all the frames of the film F have been exposed, the controller 110 stops the second motor 60 (Step S271), and immediately thereafter, the controller 100 actuates the second motor to rotate its rotating shaft 60a in the reverse direction (Step S273), keeps the hold of the shutter charge in the shutter blade driver 50b not to be released (Step S275) and then stops the second motor 60 (Step S277). The reverse rotation of the second motor 60 at Step S273 releases the engagement of the planet gear 75b of the planetary gear 75 with the pinion 65a fixed on the shaft 65, which makes the film take-up spool 35 to be rotatable in a free state (Step S279).

Thereafter, the controller 110 actuates the first motor 52 in the forward rotational direction to rotate the spool 11 in the clockwise direction in FIG. 15 so as to rewind the film F in the film cartridge 1 (Steps S281 and S283). During the rewinding operation at Step S283 the controller 110 correspondingly and consecutively records the photographic data of the exposed frames of the film F, which have been stored in the storing device 116, onto the magnetic layers of the exposed frames of the film F through the magnetic head 55b (Step S285).

Thereafter, in the case that no perforation of the film F is detected through the pair of reflectors 55a for a predetermined period of time, the controller 110 controls the first motor 52 to continue rotating its rotating shaft 52a in the forward rotating direction for a predetermined period of time so as to rewind to accommodate all the film F in the film cartridge 1 (Step S289). After the predetermined time elapses the controller 110 stops the first motor 52 (Step S291). Thereafter, when the openable cover for opening or closing the film chamber 33 is unlocked (Step S293), the door 19 of the film cartridge 1 is closed through the aforementioned cartridge door drive mechanism (Step S295). In this state the film cartridge 1 can be taken out of the film chamber 33 (Step S297).

In the camera 300 of the second embodiment, the selecting switch 118 is provided at an operable position on the upper wall of the camera body 30a so that a photographer may operate the switch 118 to optionally select either the regular wind control or the prewind control, as mentioned above. However, instead of providing the selecting switch 118 at such an operable position on the camera body 30a, a selecting switch corresponding to the selecting switch 118 may be provided at any position inside the camera body 30a so that the selecting switch may be accessible only during assembly or repair of the camera 300.

As can be seen from the foregoing, according to the second embodiment of the camera 300 to which the second aspect of the present invention is applied, since the camera is provided with the first motor, which performs the film advancing operation and the film rewinding operation, the second motor, which performs the film winding operation, the wind control selecting means for selecting either the regular wind control or the prewind control, and means for controlling the first motor and the second motor in accordance with one of the regular wind control and the prewind control which has been selected through the wind control selecting means, a simple structure can be realized which makes it possible to select either the regular wind control or the prewind control.

Furthermore, according to the embodiments of the camera 30 or 300 to which the present invention is applied, the second motor 60 is used not only for the film winding operation but also for the shutter charging operation and the mirror up/down operations, thus resulting in a small number of motors necessary for the camera, thus realizing a small and compact camera.

Although the film cartridge used in the camera 30 or camera 300 is the specific type of film cartridge disclosed in U.S. Pat. No. 5,122,820 or U.S. Pat. No. 5,296,887, the present invention may be applied to any other camera using another type of film cartridge.

Although the present invention is directed to the SLR cameras 30 or 300 in the above embodiments, the present invention may be directed to a lens-shutter type camera.

Although the camera 30 or 300 uses the film cartridge 1 having the film F on which the magnetic layer is formed, another type of film having no magnetic layer thereon may also be used for the camera.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An SLR camera which uses a film cartridge having a spool, comprising:

a first motor which performs a film advancing operation, in which said first motor rotates said spool to advance a film wound on said spool from said film cartridge, and a film rewinding operation, in which said first motor rotates said spool so as to rewind said film into said film cartridge; and a second motor which performs a film winding operation, in which said second motor rotates a film take-up spool provided in said SLR camera to wind said film around said film take-up spool, a shutter charging operation, in which a shutter charge is performed, a mirror up operation, in which a quick-return mirror provided in said SLR camera is moved up after a shutter release, and a mirror down operation, in which said quick-return mirror is moved down after said mirror up operation is completed.

2. The SLR camera according to claim 1, wherein said first motor is provided in said SLR camera positioned between a mirror box, in which said quick-return mirror is rotatably supported, and a film chamber, which is formed in said SLR camera for accommodating said film cartridge, and further wherein said first motor is provided with a rotating shaft extending normal to a moving direction of said film and parallel to a plane of said film.

3. The SLR camera according to claim 2, further comprising a shutter blade drive mechanism positioned between a spool chamber, in which said film take-up spool is rotatably supported, and said mirror box, wherein said second motor is provided in said SLR camera adjacent to said shutter blade drive mechanism, and further wherein said second motor is provided with a rotating shaft extending parallel to said moving direction of said film.

4. The SLR camera according to claim 1, wherein said first motor performs said film advancing operation by rotating a rotating shaft of said first motor in a first rotational direction, wherein said first motor performs said film rewinding operation by rotating said rotating shaft of said first motor in a second rotational direction, wherein said second motor performs any on of said shutter charging operation, said mirror up operation and said mirror down operation by rotating a rotating shaft of said second motor in a first rotational direction, and wherein said second motor performs said film winding operation by rotating said rotating shaft of said second motor in a second rotational direction.

5. The SLR camera according to claim 3, wherein said first motor performs said film advancing operation by rotating said rotating shaft of said first motor in a first rotational direction, wherein said first motor performs said film rewinding operation by rotating said rotating shaft of said first motor in a second rotational direction, wherein said second motor performs any one of said shutter charging operation, said mirror up operation and said mirror down operation by rotating a rotating shaft of said second motor in a first rotational direction, and wherein said second motor performs said film winding operation by rotating said rotating shaft of said second motor in a second rotational direction.

6. The SLR camera according to claim 1, wherein said film cartridge comprises a rotational member which rotates together with said spool, said rotational member being provided with a bar code, and wherein said first motor further performs a rotating member driving operation, in which said first motor rotates said rotational member by rotating said spool so as to read information from said bar code.

7. The SLR camera according to claim 6, wherein said first motor is provided in said SLR camera positioned between a mirror box, in which said quick-return mirror is rotatably supported, and a film chamber, which is formed in said SLR camera for accommodating said film cartridge, and further wherein said first motor is provided with a rotating shaft extending normal to a moving direction of said film and parallel to a plane of said film.

8. The SLR camera according to claim 7, further comprising a shutter blade drive mechanism positioned between a spool chamber, in which said film take-up spool is rotatably supported, and said mirror box, wherein said second motor is provided in said SLR camera adjacent to said shutter blade drive mechanism, and further wherein said second motor is provided with a rotating shaft extending parallel to said moving direction of said film.

9. The SLR camera according to claim 6, wherein said first motor performs said film advancing operation by rotating a rotating shaft of said first motor in a first rotational direction, wherein said first motor performs either said film rewinding operation or said rotating member driving operation by rotating said rotating shaft of said first motor in a second rotational direction, wherein said second motor performs any one of said shutter charging operation, said mirror up operation and said mirror down operation by rotating a rotating shaft of said second motor in a first rotational direction, and wherein said second motor performs said film winding operation by rotating said rotating shaft of said second motor in a second rotational direction.

10. The SLR camera according to claim 8, wherein said first motor performs said film advancing operation by rotating said rotating shaft of said first motor in a first rotational direction, wherein said first motor performs either said film rewinding operation or said rotating member driving operation by rotating said rotating shaft of said first motor in a second rotational direction, wherein said second motor performs any one of said shutter charging operation, said mirror up operation and said mirror down operation by rotating a rotating shaft of said second motor in a first rotational direction, and wherein said second motor performs said film winding operation by rotating said rotating shaft of said second motor in a second rotational direction.

11. The SLR camera according to claim 1, further comprising a first planetary gear consisting of a sun gear and a planet gear engaging with and revolving around said sun gear, said first planetary gear being positioned between said first motor and said spool, wherein said film advancing operation is performed with said planet gear being located at a first position, where said planet gear is in mesh with a spool drive gear coaxially connected to said spool, and further wherein either said film rewinding operation or said rotating member driving operation is performed with said planet gear being located at a second position, where said planet gear is connected to said spool drive gear through two relay gears.

12. The SLR camera according to claim 1, further comprising a second planetary gear consisting of a sun gear and a planet gear engaging with and revolving around said sun gear, said sun gear and said planet gear being provided for transmitting a rotation of said second motor to either said film take-up spool or a shutter charge gear through which said shutter charge is performed, said film winding operation being performed with said planet gear being located at a first position where said planet gear is connected to a film take-up spool drive gear coaxially connected to said film take-up spool through a plurality of gears, and any one of said shutter charging operation, said mirror up operation and said mirror down operation being performed with said planet gear being located at a second position where said planet gear is connected to said shutter charge gear through a reduction gear train.

13. A camera which uses a film cartridge having a spool on which a film is wound, comprising:

a film chamber in which said film cartridge is accommodated;

a spool chamber in which a film take-up spool for winding said film thereon is rotatably supported;

a first motor which performs a film advancing operation, in which said first motor rotates said spool so as to advance said film wound on said spool from said film cartridge, and a film rewinding operation, in which said first motor rotates said spool to rewind said film into said film cartridge;

a second motor which performs a film winding operation, in which said second motor rotates said film take-up spool to wind said film around said film take-up spool; and means for controlling said first motor and said second motor, wherein said controlling means actuates said first motor with pulse current and direct current when said first motor performs said film advancing operation and said film rewinding operation, respectively.

14. The camera according to claim 13, wherein said controlling means actuates said second motor with direct current when said second motor performs said film winding operation.

15. The camera according to claim 13, wherein said camera is an SLR camera, and wherein said second motor further performs a shutter charging operation, in which a shutter charge is performed, a mirror up operation, in which a quick-return mirror provided in said SLR camera is moved up after a shutter release, and a mirror down operation, in which said quick-return mirror is moved down after said mirror up operation is completed.

16. The camera according to claim 13, wherein said film cartridge comprises a rotational member which is rotated together with said spool, said rotational member being provided with a bar code, wherein said camera further comprises means for reading information from said bar code, and wherein said first motor further performs a rotating member driving operation, in which said first motor rotates said rotational member by rotating said spool so that said reading means reads said information from said bar code.

17. The camera according to claim 15, wherein said first motor is provided in said SLR camera positioned between a mirror box, in which said quick-return mirror is rotatably supported, and said film chamber, and further wherein said first motor is provided with a rotating shaft extending normal to a moving direction of said film and parallel to a plane of said film.

18. The camera according to claim 17, further comprising a shutter blade drive mechanism positioned between said spool chamber and said mirror box, wherein said second motor is provided in said SLR camera adjacent to said shutter blade drive mechanism, and further wherein said second motor is provided with a rotating shaft extending parallel to said moving direction of said film.

19. A camera which uses a film cartridge having a spool on which a film is wound, comprising:

a film chamber in which said film cartridge is accommodated;

a spool chamber in which a film take-up spool for winding said film thereon is rotatably supported;

a first motor which performs a film advancing operation, in which said first motor rotates said spool so as to advance said film wound on said spool from said film cartridge, and a film rewinding operation, in which said first motor rotates said spool so as to rewind said film into said film cartridge;

a second motor which performs a film winding operation, in which said second motor rotates said film take-up spool so as to wind said film around said film take-up spool;

a wind control selecting means for selecting either a regular wind control, in which said second motor rotates said film take-up spool to wind said film in said spool chamber by one frame each time a picture is taken after said film cartridge has been loaded in said film chamber, or a prewind control, in which said second motor starts rotating said film take-up spool to wind up all said film in said spool chamber immediately after said film cartridge has been loaded in said film chamber and in which said first motor rotates said spool to rewind said film in said film chamber by one frame each time a picture is taken; and means for controlling said first motor and said second motor in accordance with one of said regular wind control and said prewind control which has been selected through said wind control selecting means.

20. The camera according to claim 19, wherein said wind control selecting means comprises an operational switch for manually selecting either said regular wind control or said prewind control.

21. The camera according to claim 20, wherein said operational switch is provided on a camera body at a position where said operational switch may be operable from outside said camera body.

22. The camera according to claim 20, wherein said operational switch is provided inside a camera body at a position where said operational switch may not be operable from outside said camera body.

23. The camera according to claim 19, further comprising:

means for storing photographic data regarding each exposed frame of said film;

a magnetic head for recording said photographic data on a magnetic layer formed on said film;

means for recording said photographic data of one frame of said film on a corresponding portion of said magnetic layer through said magnetic head when said one frame is exposed, in a case where said prewind control is selected through said wind control selecting means, and for firstly storing said photographic data in said storing means each time a picture is taken, and secondly recording all said stored photographic data correspondingly and consecutively on said magnetic layer through said magnetic head when all said film is rewound in said film cartridge, in a case where said regular wind control is selected through said wind control selecting means.

24. The camera according to claim 23, wherein said magnetic head is positioned between said film chamber and a photographic aperture through which light of a subject is incident upon said film, said photographic aperture being formed between said film chamber and said spool chamber.

25. The camera according to claim 19, wherein said camera is an SLR camera, said second motor further performing a shutter charging operation, in which a shutter charge is performed, a mirror up operation, in which a quick-return mirror provided in said SLR camera is moved up after a shutter release, and a mirror down operation, in which said quick-return mirror is moved down after said mirror up operation is completed.

26. The camera according to claim 25, wherein said first motor is provided in said SLR camera positioned between a mirror box, which rotatably supports said quick-return mirror in said mirror box, and said film chamber, and further wherein said first motor is provided with a rotating shaft extending normal to a moving direction of said film and parallel to a plane of said film.

27. The camera according to claim 26, further comprising a shutter blade drive mechanism positioned between said spool chamber and said mirror box, wherein said second motor is provided in said SLR camera adjacent to said shutter blade drive mechanism, and further wherein said second motor is provided with a rotating shaft extending parallel to said moving direction of said film.

* * * * *

UNITED STATES PATENT AND TRADEMARK OFFICE
CERTIFICATE OF CORRECTION

PATENT NO. : 5,646,711  
DATED : Jul. 8, 1997  
INVENTOR(S) : Kitazawa et al.

Page 1 of 2

Figure 19:
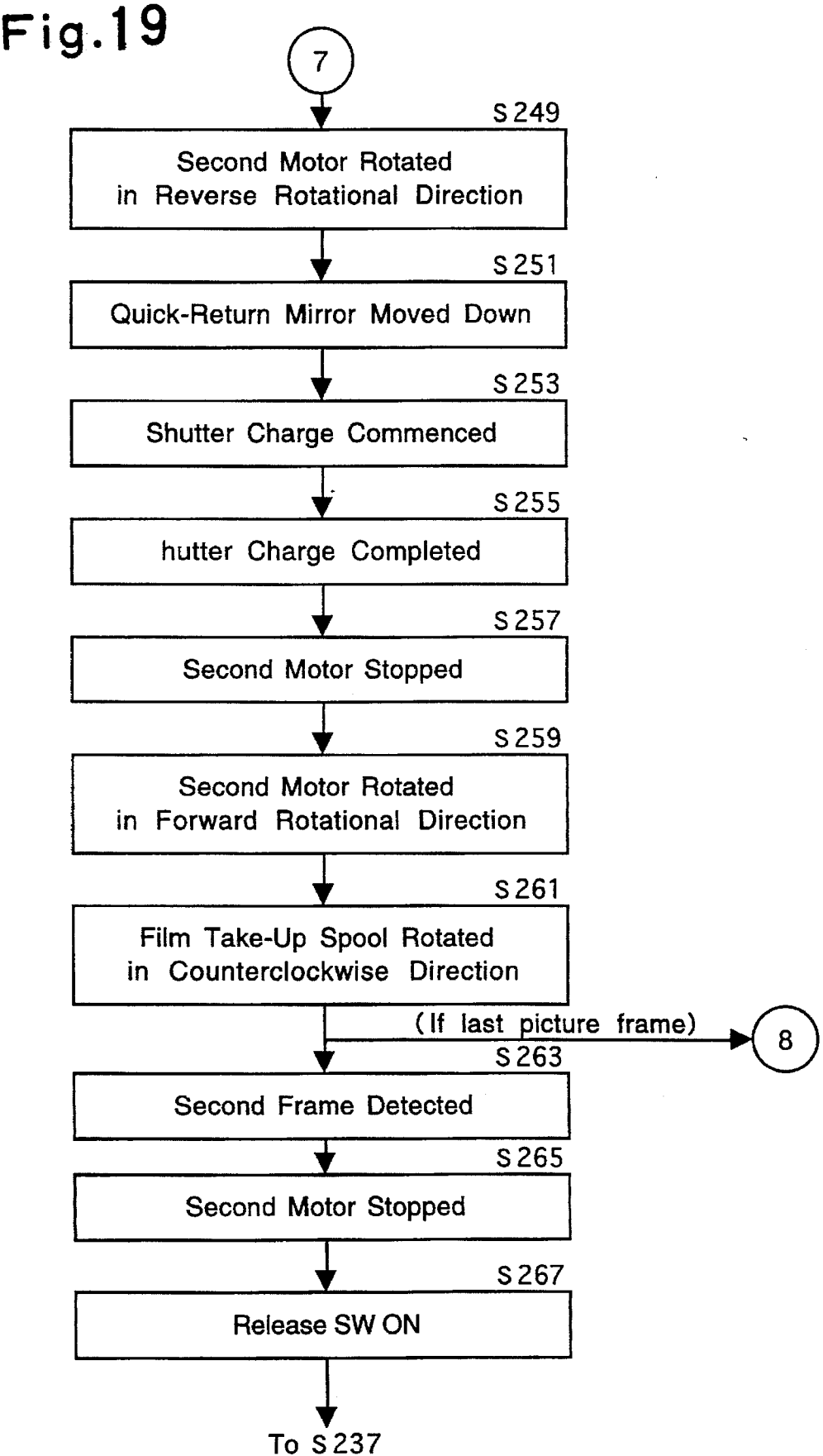

It is certified that error appears in the above-identified patent and that said Letters Patent is hereby corrected as shown below:

Please delete drawing Fig. 19 and substitute drawing Fig. 19 as per attached.

Signed and Sealed this

Ninth Day of March, 1999

*Attest:*

*Attesting Officer*

Q. TODD DICKINSON

*Acting Commissioner of Patents and Trademarks*